(12) United States Patent
Kornbluh et al.

(10) Patent No.: US 7,649,276 B2
(45) Date of Patent: Jan. 19, 2010

(54) WAVE POWERED GENERATION

(75) Inventors: Roy D. Kornbluh, Palo Alto, CA (US);
Ronald E. Pelrine, Longmont, CO (US);
Harsha Prahlad, Cupertino, CA (US);
Seiki Chiba, Tokyo (JP); Joseph S. Eckerle, Redwood City, CA (US);
Bryan Chavez, Palo Alto, CA (US);
Scott E. Stanford, Mountain View, CA (US); Thomas Low, Belmont, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 11/830,722

(22) Filed: Jul. 30, 2007

(65) Prior Publication Data

US 2008/0016860 A1 Jan. 24, 2008

Related U.S. Application Data

(63) Continuation of application No. 11/684,426, filed on Mar. 9, 2007.

(60) Provisional application No. 60/797,974, filed on May 5, 2006, provisional application No. 60/852,718, filed on Oct. 18, 2006.

(51) Int. Cl.
*F03B 13/10* (2006.01)
*F03B 13/12* (2006.01)

(52) U.S. Cl. .......................... 290/53; 290/42

(58) Field of Classification Search ............. 290/53, 290/42
See application file for complete search history.

(56) References Cited

U.S. PATENT DOCUMENTS

| | | | | |
|---|---|---|---|---|
| 3,064,137 A | | 11/1962 | Corbett, Jr. et al. | 290/53 |
| 3,204,110 A | | 8/1965 | Masuda | 290/42 |
| 3,546,473 A | * | 12/1970 | Rich | 290/42 |
| 3,696,251 A | * | 10/1972 | Last et al. | 290/53 |
| 3,783,302 A | * | 1/1974 | Woodbridge | 290/42 |
| 4,110,630 A | | 8/1978 | Hendel | 290/53 |
| 4,260,901 A | * | 4/1981 | Woodbridge | 290/42 |
| 4,319,454 A | | 3/1982 | Lucia | 60/506 |
| 4,355,511 A | | 10/1982 | Jones | 60/507 |
| 4,389,843 A | | 6/1983 | Lamberti | 60/507 |
| 4,539,485 A | * | 9/1985 | Neuenschwander | 290/53 |

(Continued)

FOREIGN PATENT DOCUMENTS

JP     5-253175     10/1993

OTHER PUBLICATIONS

Bar-Cohen, Y., (ed.), Electroactive Polymer (EAP) Actuators as Artificial Muscles—Reality, Potential and Challenges, SPIE Press, Bellingham, Washington, 2001.

(Continued)

*Primary Examiner*—Nicholas Ponomarenko
*Assistant Examiner*—Pedro J Cuevas
(74) *Attorney, Agent, or Firm*—Beyer Law Group LLP

(57) ABSTRACT

Described herein are marine devices and methods that convert mechanical energy in one or more waves to mechanical energy that is better suited for conversion into electrical energy. The marine devices employ a mechanical energy conversion system that harnesses wave energy and converts it into limited motion that is suitable for input to an electrical energy generator.

12 Claims, 16 Drawing Sheets

U.S. PATENT DOCUMENTS

| | | | | |
|---|---|---|---|---|
| 4,655,332 A * | 4/1987 | Herbulot et al. | 192/70.28 |
| 4,718,231 A | 1/1988 | Vides | 60/398 |
| 4,742,241 A | 5/1988 | Melvin | 290/53 |
| 4,754,157 A * | 6/1988 | Windle | 290/53 |
| 5,167,786 A * | 12/1992 | Eberle | 204/228.2 |
| 5,359,229 A | 10/1994 | Youngblood | 290/53 |
| 5,552,657 A | 9/1996 | Epstein | 310/339 |
| 5,696,413 A * | 12/1997 | Woodbridge et al. | 310/15 |
| 6,020,653 A * | 2/2000 | Woodbridge et al. | 290/53 |
| 6,219,589 B1 * | 4/2001 | Faraz et al. | 700/254 |
| 6,229,225 B1 | 5/2001 | Carroll | 290/53 |
| 6,291,904 B1 | 9/2001 | Carroll | 290/53 |
| 6,392,314 B1 | 5/2002 | Dick | 290/53 |
| 6,545,384 B1 | 4/2003 | Pelrine et al. | 310/309 |
| 6,617,705 B1 | 9/2003 | Smalser et al. | 290/42 |
| 6,628,040 B2 | 9/2003 | Pelrine et al. | 310/307 |
| 6,644,027 B1 * | 11/2003 | Kelly | 60/498 |
| 6,647,716 B2 | 11/2003 | Boyd | 60/398 |
| 6,731,019 B2 | 5/2004 | Burns | 290/42 |
| 6,768,246 B2 | 7/2004 | Pelrine et al. | 310/339 |
| 6,781,284 B1 | 8/2004 | Pelrine et al. | 310/330 |
| 6,791,205 B2 * | 9/2004 | Woodbridge | 290/53 |
| 6,809,462 B2 | 10/2004 | Pelrine et al. | 310/319 |
| 6,812,624 B1 | 11/2004 | Pei et al. | 310/309 |
| 6,833,631 B2 * | 12/2004 | Van Breems | 290/42 |
| 6,864,592 B1 * | 3/2005 | Kelly | 290/42 |
| 6,882,086 B2 | 4/2005 | Kornbluh et al. | 310/328 |
| 7,012,340 B2 * | 3/2006 | Yi | 290/42 |
| 7,034,432 B1 | 4/2006 | Pelrine et al. | 310/309 |
| 7,045,912 B2 | 5/2006 | Leijon et al. | 290/42 |
| 7,064,472 B2 | 6/2006 | Pelrine et al. | 310/324 |
| 7,140,180 B2 * | 11/2006 | Gerber et al. | 60/496 |
| 7,141,888 B2 * | 11/2006 | Sabol et al. | 290/53 |
| 7,164,212 B2 * | 1/2007 | Leijon et al. | 290/42 |
| 7,166,953 B2 | 1/2007 | Heim et al. | 310/333 |
| 7,199,481 B2 * | 4/2007 | Hirsch | 290/42 |
| 7,199,501 B2 | 4/2007 | Pei et al. | 310/311 |
| 7,242,106 B2 * | 7/2007 | Kelly | 290/42 |
| 7,245,041 B1 | 7/2007 | Olson | 290/53 |
| 7,259,503 B2 | 8/2007 | Pei et al. | 310/363 |
| 7,298,054 B2 * | 11/2007 | Hirsch | 290/42 |
| 7,304,399 B2 * | 12/2007 | Leijon et al. | 290/42 |
| 7,305,823 B2 | 12/2007 | Stewart et al. | 60/495 |
| 7,323,790 B2 * | 1/2008 | Taylor et al. | 290/42 |
| 7,352,073 B2 | 4/2008 | Ames | 290/42 |
| 7,362,032 B2 | 4/2008 | Pelrine et al. | 310/309 |
| 7,368,862 B2 | 5/2008 | Pelrine et al. | 310/365 |
| 7,378,783 B2 | 5/2008 | Pelrine et al. | 310/311 |
| 7,385,301 B2 | 6/2008 | Hirsch | 290/42 |
| 7,453,165 B2 | 11/2008 | Hench | 290/53 |
| 7,474,013 B2 | 1/2009 | Greenspan et al. | 290/53 |
| 7,525,214 B2 | 4/2009 | Medina et al. | 290/53 |
| 7,538,445 B2 * | 5/2009 | Kornbluh et al. | 290/53 |
| 7,557,456 B2 * | 7/2009 | Kornbluh et al. | 290/53 |
| 2004/0061338 A1 * | 4/2004 | Woodbridge | 290/53 |
| 2004/0064195 A1 * | 4/2004 | Herr | 623/24 |
| 2004/0163389 A1 * | 8/2004 | Gerber et al. | 60/595 |
| 2004/0239120 A1 * | 12/2004 | Yi | 290/42 |
| 2004/0251692 A1 * | 12/2004 | Leijon et al. | 290/42 |
| 2005/0235641 A1 * | 10/2005 | Sabol et al. | 60/497 |
| 2005/0237775 A1 * | 10/2005 | Sabol et al. | 363/178 |
| 2006/0095180 A1 * | 5/2006 | Ummethala et al. | 701/37 |
| 2006/0200287 A1 * | 9/2006 | Parison et al. | 701/37 |
| 2006/0208839 A1 * | 9/2006 | Taylor et al. | 335/205 |
| 2007/0040384 A1 * | 2/2007 | Bernhoff et al. | 290/42 |
| 2007/0080539 A1 * | 4/2007 | Kelly | 290/42 |
| 2007/0090652 A1 * | 4/2007 | Leijon et al. | 290/53 |
| 2007/0132246 A1 * | 6/2007 | Hirsch | 290/42 |
| 2007/0158950 A1 * | 7/2007 | Crespo | 290/53 |
| 2007/0162152 A1 * | 7/2007 | Herr et al. | 623/24 |
| 2007/0257490 A1 * | 11/2007 | Kornbluh et al. | 290/53 |
| 2007/0257491 A1 * | 11/2007 | Kornbluh et al. | 290/53 |
| 2007/0278057 A1 * | 12/2007 | Wereley et al. | 188/267.1 |
| 2008/0015753 A1 * | 1/2008 | Wereley et al. | 701/45 |
| 2008/0074083 A1 | 3/2008 | Yarger et al. | 320/137 |
| 2008/0088134 A1 | 4/2008 | Montgomery | 290/53 |
| 2008/0122225 A1 | 5/2008 | Smith | 290/42 |
| 2008/0156602 A1 | 7/2008 | Hiemenz et al. | 188/267.1 |
| 2008/0203850 A1 | 8/2008 | Martineau | 310/309 |
| 2008/0238103 A1 | 10/2008 | Montgomery | 290/53 |
| 2008/0265582 A1 | 10/2008 | Hench | 290/53 |
| 2008/0284173 A1 | 11/2008 | Stansby et al. | 290/53 |
| 2009/0008942 A1 | 1/2009 | Clement et al. | 290/53 |
| 2009/0146429 A1 * | 6/2009 | Protter et al. | 290/53 |

OTHER PUBLICATIONS

Product Information from Freeplay Energy website, www.freeplayenergy.com, printed Mar. 13, 2008.

Graw, "Shore protection and electricity by submerged plate wave energy converter," European Wave Energy Symposium, Edinburgh, UK, 1993. Available online at www.uni-leipzig.de/~grw/lit/texte_099/14_1993/14_1993_euwen.pdf, 1993.

Hanley, "Off-grid power systems for rural distance education schools," presentation at Village Power Conference Workshop, Sandia National Laboratories, Dec. 4, 2000. Available online at www.rsvp.nrel.gov.

Kornbluh et al., "Electroelastomers: applications of dielectric elastomer transducers for actuation, generation and smart structures," *Smart Structures and Materials 2002: Industrial and Commercial Applications of Smart Structures Technologies*, ed. A. McGowan, Proc. SPIE 4698, pp. 254-270, 2002.

Moretti, "Tension in Fluttering Flags," 23rd Oklahoma AIAA/ASME Symposium, University of Oklahoma, Norman, Mar. 8, 2003.

Park et al., "Ultrahigh strain and piezoelectric behavior in relaxor based ferroelectric single crystals," J. Applied Physics 82, pp. 1804-1811, 1997.

Paul, "Quiet, small, lightweight, heavy-fueled mini generator sets for power needs of soldiers and unmanned ground vehicles," 2002. (Available at http://www.asc2002.com/manuscripts/F/F0-05.pdf) Also, for example, information on the performance of a small Cox engine, the commercially available industry standard often used for MAVs can be found at http://www.aero.ufl.edu/~issmo/mav/Morris/morris.htm.

Pelrine et al., "Dielectric Elastomers: Generator Mode Fundamentals and Applications," in *Smart Structures and Materials 2001: Electroactive Polymer Actuators and Devices*, ed. Y. Bar-Cohen, Proc. SPIE 4329, pp. 148-156, 2001.

Pelrine et al., "Electrostriction of Polymer Films for Microactuators," The Tenth Annual International Workshop on Micro Electromechanical Systems, IEEE, Nagoya, Japan, pp. 238-243 (Jan. 1997).

Prahlad et al., "Polymer power: Dielectric elastomers and their applications in distributed actuation and power generation," Proceedings of ISSS 2005, International Conference on Smart Materials Structures and Systems, Jul. 28-30, Bangalore, India, 2005.

Wax et al., "Electroactive Polymer Actuators and Devices," in Smart Structures and Materials 1999: Electroactive Polymer Actuators and Devices (EAPAD) ed. Bar-Cohen, Proc. SPIE 3369, pp. 2-10, 1999.

Web site on pedal power pack unit developed by Center for Renewable Energy, Nepal, www.namstct.org/pppre.htm.

Xu, "Plastic electronics and future trends in microelectronics," Synthetic Metals 115, Issue 1, pp. 1-3, 2000. Available online at http://netserv.ipc.uni-linz.ac.at/~dieter/DsWeb/Lit/SyM/SyM115(00)1.pdf.

International Search Report dated Feb. 12, 2008 in PCT Application No. PCT/US07/08573.

Written Opinion dated Feb. 12, 2008 in PCT Application No. PCT/US07/08573.

International Search Report dated Feb. 15, 2008 in PCT Application No. PCT/US07/08572.

Written Opinion dated Feb. 15, 2008 in PCT Application No. PCT/US07/08572.
U.S. Appl. No. 12/043,776, filed Mar. 6, 2008.
Office Action dated Nov. 18, 2008 in U.S Appl. No. 11/684,426.
Notice of Allowance dated Jan. 12, 2009 in U.S Appl. No. 11/684,423.
Notice of Allowance dated Mar. 31, 2009 in U.S Appl. No. 11/684,423.
Notice of Allowance dated Mar. 9, 2009 in U.S Appl. No. 11/684,426.

* cited by examiner

WAVE POWERED GENERATION

CROSS-REFERENCE TO RELATED APPLICATIONS

This application is a continuation and claims priority under 35 U.S.C. §120 from U.S. patent application Ser. No. 11/684,426, filed Mar. 9, 2007 and entitled "Wave Powered Generation," which claims priority under 35 U.S.C. 119(e) from a) U.S. Provisional Patent Application No. 60/797,974 filed May 5, 2006, and b) U.S. Provisional Patent Application No. 60/852,718 filed Oct. 18, 2006; each of these patent applications is incorporated by reference herein in its entirety for all purposes.

FIELD OF THE INVENTION

The present invention relates generally to devices and methods that generate electrical energy. More particularly, the present invention relates to devices and methods that convert mechanical energy in one or more waves to electrical energy.

BACKGROUND OF THE INVENTION

Many marine devices consume electrical power. Buoys for example include onboard lighting and communication systems that constantly rely on an on-board power source.

Batteries are currently used to supply electrical energy to remote marine devices such as buoys. Non-rechargeable batteries inevitably run out of energy, which necessitates inconvenient and costly battery maintenance. Rechargeable batteries need a power source to recharge them.

Waves offer a continuous and ample source of mechanical energy, but harnessing the wave energy for conversion into electrical energy has been problematic to date. A reliable way to harness wave power and produce electrical energy in remote marine environments would be beneficial.

SUMMARY OF THE INVENTION

The present invention provides marine devices and methods that convert mechanical energy in one or more waves to mechanical energy that is better suited for conversion into electrical energy. The marine devices employ a mechanical energy conversion system that harnesses wave energy and converts it into constrained motion that is suitable for input to an electrical energy generator.

In one aspect, the present invention relates to a marine device. The marine device includes a body, a mechanical energy transmission system, and a generator. The marine device is configured such that a portion of the body rests above a water surface level when the marine device floats. The mechanical energy transmission system includes a moving portion that is configured to move relative to the portion of the body that rests above the water surface level in response to a water surface level change. The generator is mechanically coupled to the moving portion, mechanically coupled to the portion of the body that rests above the water surface level, and configured to produce electrical energy using movement of the moving portion.

In another aspect, the present invention relates to a marine device. The marine device includes a body, a mechanical energy transmission system, and a generator. The mechanical energy transmission system includes: a) an energy storage mass that is configured to move relative to the body in response to a water surface level change that causes movement of the body relative to the water surface level, and b) a spring mechanically coupled to the energy storage mass and mechanically coupled to the body. The spring includes a stiffness that provides a resonant frequency for the mechanical energy transmission system within about 0.2 Hertz of a resonant frequency for the marine device.

In yet another aspect, the present invention relates to a marine device. The marine device includes a body, a mechanical energy transmission system, and a generator. The mechanical energy transmission system includes: a) a first energy storage mass that is configured to move relative to the body in response to a water surface level change that causes tilting of the body relative to the water surface level, and b) a second energy storage mass that is configured to move relative to the body in response to the water surface level change. The generator is mechanically coupled to the first energy storage mass or the second energy storage mass and configured to produce electrical energy using kinetic energy of the first energy storage mass or the second energy storage mass.

In still another aspect, the present invention relates to a buoy. The buoy includes a body, a mechanical energy transmission system, a generator, and a light. The buoy is configured such that a portion of the body rests above a surface level of water when the buoy floats. The light is adapted to use electrical energy produced by the generator.

In another aspect, the present invention relates to a method of generating electrical energy in a marine device. The method includes floating the marine device on water such that a portion of the body rests above a water surface level when the marine device floats on the water. The method also includes moving a portion of a mechanical transmission system relative to the marine device body in response to a water surface level change. The method further includes generating electrical energy using movement of the moving portion.

These and other features and advantages of the present invention will be described in the following description of the invention and associated figures.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Introduction

This disclosure describes marine devices that harness mechanical energy in waves for conversion to and generation of electrical energy. This occurs in a two-stage process. The first stage translates mechanical energy in a wave, whose displacement and frequency are often inconsistent and unpredictable, to mechanical energy that is better suited for electrical/mechanical conversion. In one embodiment, this mechanical transmission translates the wave mechanical energy into movement of an energy storage mass in one or more known directions, e.g., moving the energy storage mass along a linear slide. In another embodiment, a linear translation mechanism couples relative motion of two different parts of a marine device. For example, wave motion may cause a relative motion between a flotation element and a reaction plate or anchor; this relative displacement then serves as limited and harnessed mechanical input suitable for a generator that receives linear motion as an input. The second stage converts the harnessed mechanical energy—whose direction of displacement is known and configured for input into a generator—into electrical energy. The electrical energy may be used and/or stored for subsequent use, as desired.

Figure 1:
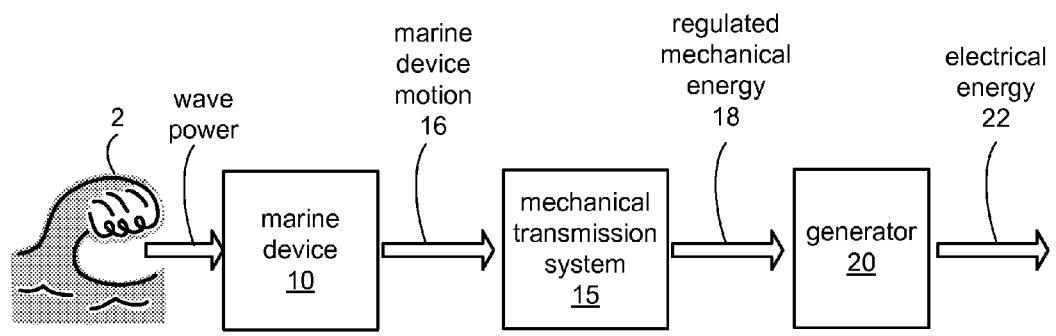
FIG. 1 shows a method overview of wave energy harvesting according to the present invention.
Figure 2:
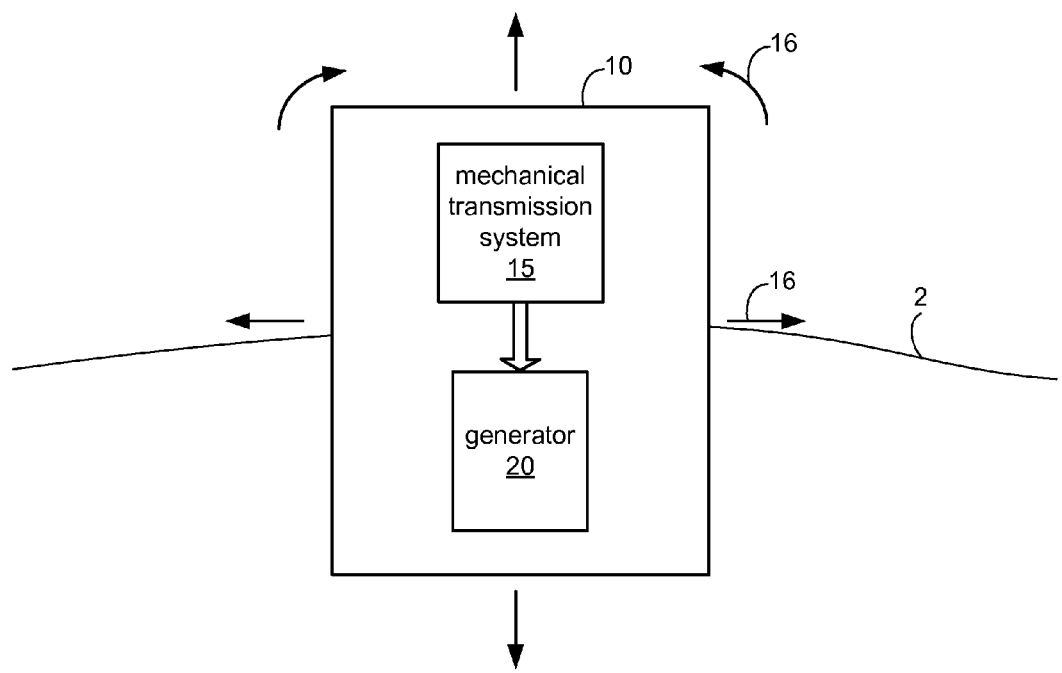
FIG. 2 illustrates a simplified marine device according to one embodiment of the present invention.

FIGS. 1-2 schematically show energy generation according to various embodiments of the present invention. FIG. 1 shows a method overview of wave energy harvesting and electrical energy generation according to one embodiment of the present invention. FIG. 2 illustrates a simplified marine device 10 in accordance with one embodiment of the present invention.

Referring initially to FIG. 1, waves 2 provide an unpredictable and untamed supply of energy. As the term is used herein, a wave refers to a change in a water surface level. 'Wave energy' refers to mechanical energy, kinetic and/or potential, in a wave. Properties that characterize mechanical energy in a wave include wave height (average peak to trough), wave period, wave direction, and water depth.

Marine device 10 refers to any apparatus or system that is deployed in or on water and consumes or transmits electrical energy. Many marine devices 10 described herein float on the water such that at least a portion of the device rests above the water surface level. Two particular marine devices 10 will be expanded upon below: a) a marine navigation buoy that includes a generator for powering an onboard lighting system, and b) a floating generator for general production of electrical energy, e.g., for supply onto a grid.

While waves offer significant amounts of energy, particularly in ocean and bay settings, their inconsistency complicates energy harvesting. The movement 16 of a floating marine device 10 relative to the water may change significantly between waves in terms of direction (e.g., upward motion for one wave, followed by angular motion of the device relative to the water surface on the next wave, followed by angular motion in a different direction for the following wave, etc.), amount of motion, wave period (or frequency), etc. Wave properties will also vary with marine environment. Waves in ocean environments are typically low frequency, in the 0.1 to 1.0 Hz range, and can be relatively high in amplitude (wave heights greater than 1 meter are common).

To tame and harness this input energy inconsistency, marine device 10 includes a mechanical energy transmission system 15 that is configured to convert mechanical energy in a wave (and irregular movement 16 of device 10 relative to the water surface 2) to regulated mechanical energy 18. In one embodiment, mechanical energy transmission system 15 is configured to convert a portion of the mechanical energy in a wave into mechanical energy of an internal energy storage mass that moves relative to the body of the marine device. For example, the mechanical energy transmission system 15 may transmit the wave power into movement of a mass slideably coupled to a linear slide and free to move along the single degree of freedom slide in response to the wave power. Energy in the wave then goes into moving both the marine device and energy storage mass, while the latter is used as input into generator 20. In another embodiment, the mechanical energy transmission system 15 transmits wave power into movement of a two portions of the marine device relative to each other. The two portions may include a frame in the marine device that is fixed relative to another portion that moves in response to the wave energy. This relative motion then serves as the controlled input into a generator.

Mechanical energy transmission system 15 permits marine device 10 to operate in a range of marine settings with widely varying wave characteristics. Suitable marine environments include open sea, bays, breakwater applications near a retaining wall, lakes, rivers and deltas, for example. Marine device 10 is well suited for use in bays where wave heights commonly vary from about 0.5 meters to about 1 meter, wave period varies from about 1 to about 4 seconds, and sea depth may vary from about 2 meters to about 40 meters. Other wave properties and marine conditions are suitable for use herein and the present invention is not limited to any particular marine environment or wave properties.

A generator 20 converts the harnessed and regulated mechanical energy into electrical energy 22. In one embodiment, generator 20 includes a conventional electro-mechanical generator that receives rotary or converted linear motion from the mechanical energy transmission system 15. In another embodiment, generator 20 includes one or more electroactive polymer generators configured to convert linear motion of a mass in the mechanical energy transmission system 15 to electrical energy. Other suitable conventional and non-conventional generators are suitable for use herein and described below.

Mechanical Energy Conversion System

This section describes suitable mechanical energy transmission systems that translate (kinetic and/or potential) mechanical energy in a wave into mechanical energy whose displacement and energy is limited to a known path or range of movements, which is then available for electrical energy generation. The mechanical energy transmission systems permit the marine device to repeatedly harvest mechanical energy in the waves, despite the inconsistency and unpredictability in wave motion and input energy. In one embodiment, the mechanical energy transmission systems convert mechanical energy outside the marine device in the environment into internal mechanical energy that is configured for input to a generator.

Figure 3:
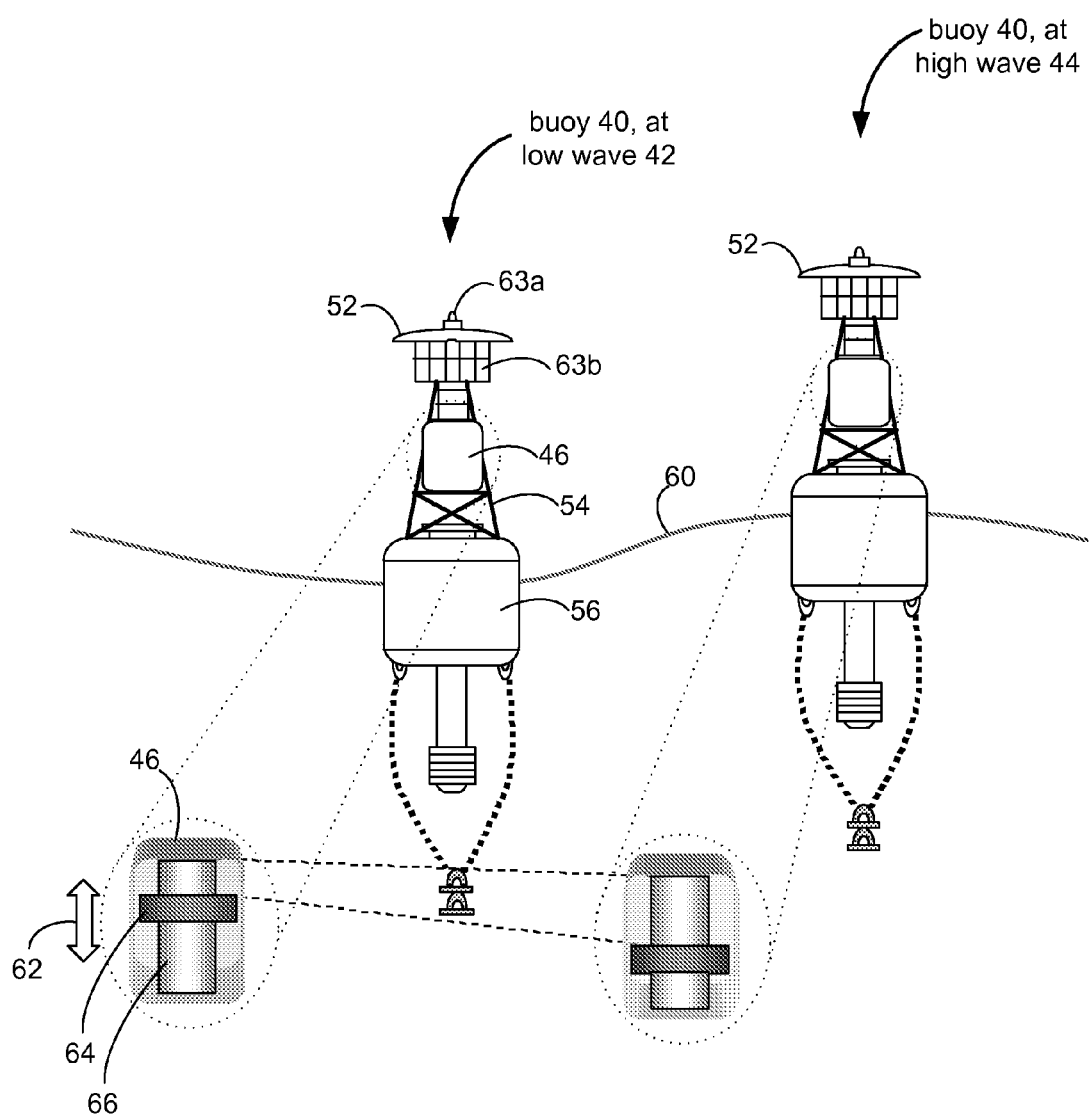
FIG. 3 shows a buoy, at two instances of wave height, in accordance with one embodiment of the present invention.

In one embodiment, marine device 10 is a buoy. FIG. 3 shows a buoy 40 in accordance with a specific embodiment of the present invention. Buoy 40 may be remotely implemented for navigation purposes and includes one or more lights 63 powered by a generation system.

FIG. 3 shows buoy 40 at two instances of wave height: a first wave height 42 and a second wave height 44. First wave height 42 corresponds to a low height for water surface level 60, such as a trough of the wave, while second wave height 42 corresponds to a high wave height for water surface level 60, such as the wave peak. Buoy 40 includes a body 52, light source 63, and a self-contained generation system 46.

Body 52 includes: a tower 54 that rests above water surface 60, and a base 56 that at least partially rests below water surface 60. Light source 63 is attached near the top of tower 54. Buoy 40 may also include a floatation collar (or other floatation devices) to assist buoyancy and keep light source 63 or another portion of body 52 above water surface 60. Base 56 includes an internal cavity (not shown in FIG. 3) defined by outer walls.

Self-contained generation system 46 includes a mechanical energy transmission system 15 and a generator. In a specific embodiment, self-contained generation system 46 is adapted for placement on an existing or slightly modified navigational buoy 40. In this instance, self-contained generation system 46 mechanically attaches to body 52 of buoy 40, such as to tower 54 or base 56, and is electrically coupled to the electrical system on buoy 40 for supplying power to operate light source 63. In another embodiment, self-contained generation system 46 is disposed in an internal cavity of base 56. As shown in FIG. 3, self-contained unit 46 is mounted on the buoy superstructure of tower 54, and can be mounted on buoy 40 long after the buoy has been manufactured or deployed. Thus, self-contained unit 46 is a separate structure that minimizes the changes needed to existing buoy designs. This embodiment permits adaptation of existing buoys to include local power generation without requiring design and purchase of new buoys. Self-contained generation system 46 then allows buoy 40 operation for long periods of time without the need for battery replacement.

FIG. 3 also shows a blow up and cross-sectional view of a particular embodiment of self-contained generation system 46, which includes mechanical energy transmission system 15 and a generator. Mechanical energy transmission system 15 converts mechanical energy in the water (and movement of buoy 40 on surface level 60) to kinetic energy of energy storage energy storage mass 64 along direction 62. In general, a mechanical energy transmission system 15 of the present invention may include any mechanical system that harnesses mechanical energy in a wave for use in electrical energy harvesting. Typically this includes transmitting at least a portion of the wave motion, energy and/or power in a wave to motion, energy and/or power of a mass along one or more predetermined degrees of freedom (e.g., linear, rotary, combinations thereof, etc.). This transmission reduces unpredictability of the input wave energy and internally regulates the mechanical energy into known directions of displacement of the mass, which facilitates electrical energy conversion by the generator. The present invention contemplates numerous designs and mechanical systems that are suitable for this purpose. Several exemplary designs are described herein; in general, however, the present invention is not limited to these designs. In a specific embodiment, mechanical energy transmission system 15 includes a dynamic vibration absorber, which is described in more detail with respect to FIG. 4.

For buoy 40, the mechanical energy conversion system 15 in self-contained unit 46 includes an energy storage mass 64 that is configured to translate linearly along a cylindrical bore or axis 66, as shown by arrow 62. Mechanical energy conversion system 15 uses movement of energy storage mass 64 along axis 66 to generate energy internal to buoy 40 and along axis 66.

In one embodiment, energy storage mass 64 is a proof-mass, or a large weight, configured to generate enough force for electrical energy generation in response to waves of low frequency. The weight of mass 64, and its distance of travel along axis 66, is a matter of design choice and may vary with the application. Factors that may affect weight of energy storage mass 64 and its travel distance include: the amount expected wave energy (wave amplitude and frequency), the amount of energy needed by the marine device, size of buoy 40, the electrical energy generation system used and its components and configuration, the effective stiffness and damping characteristics of the energy transducer (electrical energy generator) that converts the linear motion of the proof-mass to electrical energy, etc. In one embodiment, energy storage mass 64 includes a mass between about 5 kg and about 300 kg. A travel distance along axis 66 of between about 0.2 meters and about 4 meters is suitable in many applications. Other mass sizes and travel distances are also suitable. In a specific embodiment, buoy 40 includes a mass greater than 100 kg or travel greater than 1 meter to produce 25 W of power at typical wave frequencies in the ocean or a bay that receives ocean waters. Either the mass size or travel distance may be limited to improve stability of the buoy, depending on its dimensions and size.

A generator is configured to receive motion and forces of energy storage mass 64 along axis 66, and to generate electrical energy using the motion and forces of mass 64. Electrical energy generators suitable for receiving linear motion of mass 64 include electroactive polymers, linear induction generators and traditional electromagnetic generators that first convert the linear motion of mass 64 to rotary motion input of the electromagnetic generator, e.g., using a rack and pinion or other linear to rotary transmission device to convert the linear motion of mass 64 to rotary motion.

Light sources 64 include a top light source 64a and a central light source 64b. Either light source 64 may include a halogen lamps, light emitting diode, a prism for collecting and directing light to improve or focus light output, or any other conventional light source and/or light emitter.

In one embodiment, a marine device uses a dynamic vibration absorber (or 'dynamic absorber') to improve energy harvesting. Dynamic vibration absorbers may be damped or undamped. First, FIG. 4A illustrates a mechanical energy conversion system 15 configured to operate as an undamped dynamic vibration absorber 80 in accordance with one embodiment of the present invention.

As shown, dynamic absorber 80 includes a main mass 82, an absorber mass 64, a main stiffness k1, and an absorber stiffness k2. For a marine device, main mass 82 represents mass of the marine device (such as the body or hull in a buoy or breakwater generator), absorber mass 64 represents the energy storage mass 64 in the mechanical energy conversion system 15, k1 represents the stiffness of the marine device (such as stiffness of the body or hull in a buoy or breakwater generator), and k1 represents the stiffness of the mechanical energy conversion system 15 (or stiffness along axis 66 for FIG. 3).

Figure 4A:
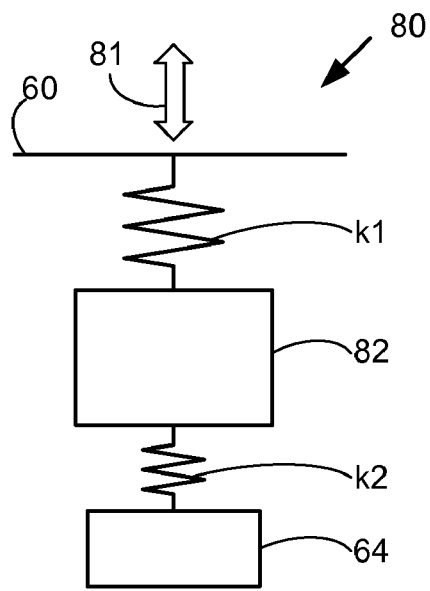
FIGS. 4A and 4B illustrates a mechanical energy conversion system that includes a dynamic absorber in accordance with one embodiment of the present invention.

Looking at FIG. 4A first without the absorber mass 64 attached, a periodic force 81, such as relative motion between the marine device and water resultant from a wave, acts on an undamped main mass-spring system 80. When the forcing frequency substantially equals the natural frequency of the main mass 82 and k1, the response and displacement of mass 82 becomes theoretically infinite. This represents resonance for main mass 82.

When an absorbing mass-spring system, or 'absorber', that includes mass 64 and k2, is attached to main mass 82 and the resonance of the absorber is tuned to substantially match that of the main mass, motion of main mass 82 is theoretically reduced to zero at its resonance frequency. Thus, the energy of main mass 82 is apparently "absorbed" by the tuned dynamic absorber. In theory, for this undamped system, motion of the absorber mass 64 is finite at this resonance frequency, even though there is no damping in either oscillator. This is theoretically because the system has changed from a one degree of freedom system to a two degree of freedom system and now has two resonance frequencies, neither of which equals the original resonance frequency of main mass 82 (and also absorber 64).

In one embodiment, mechanical energy conversion system 15 includes a dynamic absorber (e.g., mass 64 in FIG. 3 and its associated stiffness) that is tuned to resonate at a natural frequency of a marine device (the frequency at which the device would move with respect to the water). In a specific embodiment, this resonance frequency matching provides a resonant frequency for mechanical energy conversion system 15 that is within about 0.2 hertz of a resonant frequency for the marine device 10. In a specific embodiment, this resonance frequency matching provides a resonant frequency for mechanical energy conversion system 15 that is within about 0.2 Hertz of a resonant frequency for the marine device 10. This resonance matching increases the motion and harvested energy for electrical power generation provided by the mechanical energy conversion system 15. In addition, since the dynamic absorber also reduces motion and movement of the marine device, the mechanical energy conversion system also stabilizes the marine device 10. The stabilization function is useful for a navigation buoy that requires that its light location not move too much.

In a specific embodiment, suitable for instances where the wave period varies, marine devices of the present invention actively tune the absorber resonant frequency. This allows the mechanical energy conversion system 15 to operate at, and adapt to, multiple resonant frequencies and conditions. In one embodiment, a component in the electrical energy generation system contributes a stiffness that controllably varies to achieve a desired resonant frequency for the absorber. In a specific embodiment, the electrical energy generation system includes an electroactive polymer whose stiffness is controlled to tune the dynamic absorber. Electroactive polymers are described below. In addition, further description of controlling stiffness of an electroactive polymer is provided in commonly owned U.S. Pat. No. 6,882,086, which is incorporated by reference in its entirety. The applied voltage and the amount of energy withdrawn at various points in the cycle may modulate stiffness of an electroactive polymer.

Figure 4B:
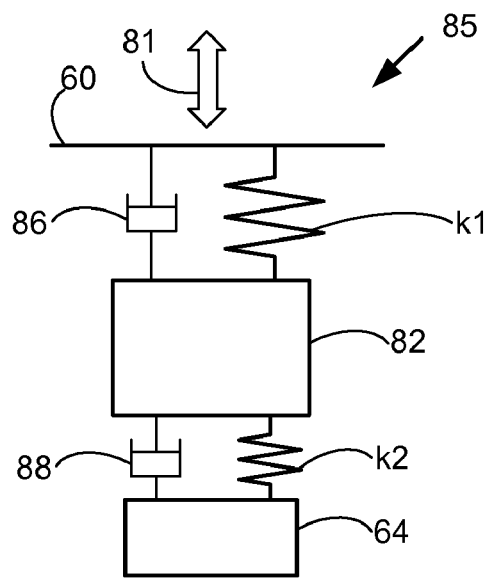

Referring now to FIG. 4B, realistically, marine device 10 includes some damping 86. Damping 86 may include interaction of the marine device 10 with the surrounding water, which provides parasitic energy losses. FIG. 4B shows mechanical energy conversion system 15 configured to operate as a damped dynamic absorber 85 in accordance with one embodiment of the present invention. In this case, the system 85 includes an effective damping 88 on the absorber mass 64. Damping 88 includes loses that result from electrical energy generation (in other words the energy that is converted from mechanical to electrical is effectively a damping) and other mechanical energy losses in marine device 10.

Damping will create new resonance frequencies in the system. Also, a finite amount of damping for both masses 82 and 64 will reduce the motion of either mass 82 and 64 at either of the new resonance frequencies. Often, if damping is present in either mass-spring element, the response of main mass 82 may no longer be theoretically zero at the target frequency.

Referring back to FIG. 3, when mechanical energy conversion system 15 includes a damped dynamic vibration absorber 85 that is tuned to the natural frequency of the marine device 10, then mechanical energy conversion system 15 decreases motion of buoy 40 and/or the anchoring structure in two manners: a) parasitic losses via (intentional) electrical energy generation, and b) (as mentioned above) conversion of motion of the buoy to the absorber mass 64 via the tuned natural frequencies. In this manner, mechanical energy conversion system 15 increases stability of buoy 40. Another way to look at buoy 40 with a dynamic absorber is that some of the wave energy that normally moves the buoy goes instead into moving mass 82 and generating electrical energy.

The previous discussion was supported by theory based on linear lumped parameter models of the buoy and power generation devices. We do not wish to be bound by theory and further note that the system can operate effectively even in the presence of nonlinearites due to varying effective masses (the effective buoy mass includes entrained water, for example), nonlinear and time varying damping (due to the electrical power generation or variations in the parasitic losses) and distributed (as opposed to lumped) masses of the buoy, proof mass and electrical generator, for example. We also note that we have so far described a system that operates along a single axis of motion. We have designed systems that operate with more than one direction of motion, such as might arise from both up and down heaving and rotary rocking of a buoy.

Other mechanical energy conversion systems 15 and marine device 10 designs are suitable for use herein. For example, mechanical energy conversion system 15 may be integrated into the structure of buoy 40 below the waterline in base 56, structurally integrated into the bottom extending stem of base 56, or other locations on a buoy above the waterline, below the waterline, and combinations thereof.

Figure 5A:
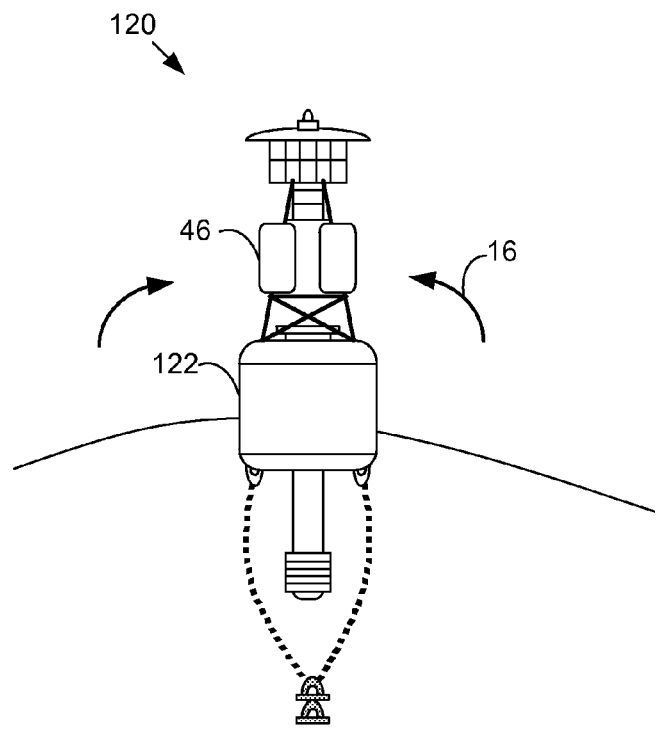
FIG. 5-9 show marine devices in accordance with various embodiments of the present invention.

FIG. 5A shows a buoy 120 in accordance with another embodiment of the present invention. Buoy 120 includes multiple mechanical energy conversion systems located around an upper periphery of the buoy body 122. Each of the mechanical energy conversion systems is included in a self-contained unit 46, situated away from the vertical center of mass for buoy 120. In FIG. 5A, buoy 120 includes four self-contained units 46 aligned vertically. More or less self-contained units 46 may also be used. In addition, the self-contained units 46 and their mechanical energy conversion systems 15 may be disposed in other locations about the buoy superstructure, which will affect the dynamic performance of the buoy in response to rocking and other motions.

This configuration, as opposed to a single self-contained unit 46 placed along the vertical center of mass of a buoy as shown in FIG. 3, allows for the capture of not only the up and down heaving of buoy 120 in the water, but also any angular rocking 16 of buoy 120. In pure vertical motion, the masses 64 in each self-contained unit 46 move in phase with one another. In rocking, they move out of phase. Also, by using more than one generator or allowing the generator to respond to rocking motion in addition to vertical motion, marine device 120 increases the overall power output.

Figure 5B:
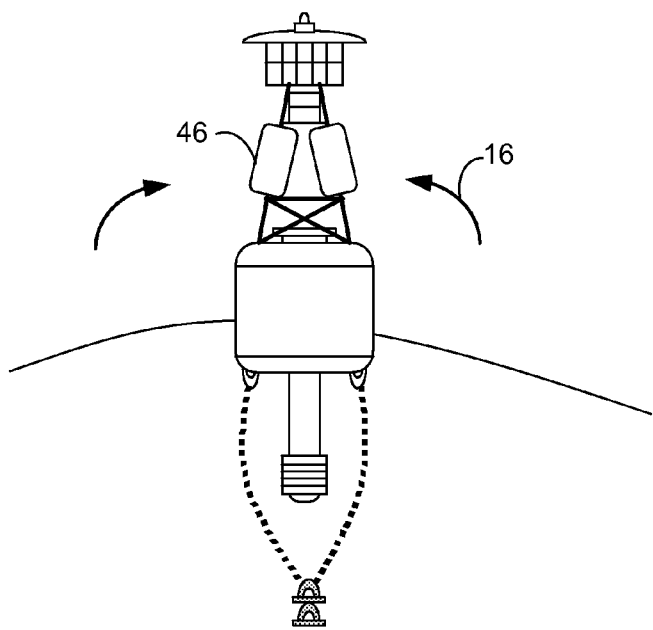

FIG. 5B shows a buoy 120 that includes four self-contained units 46, each aligned at an angle relative to a vertical axis of the buoy. This arrangement helps each self-contained unit 46 capture and translate horizontal motion more effectively. Cumulatively, multiple self-contained units 46, each aligned at an angle, permits buoy 120 to capture rocking and lateral motion in any horizontal direction. Angling the self-contained units 46 also reduces impact on the buoy profile while maintaining multi-degree of freedom energy harvesting. Additional horizontally-aligned self-contained units 46 may also be added to harvest surge motions more effectively.

When dynamic mass absorbers are used in each self-contained unit 46, this configuration also serves to stabilize buoy 120 in both modes of motion. In addition, using multiple single self-contained units 46 removes the reliance on a single unit and permits one to fail but maintain electrical energy generation.

Other mechanical energy transmission systems may be used. In another embodiment, mechanical energy transmission system 15 includes a linear translation mechanism that includes a first portion such as a rod or plunger that linearly translates along or in a second portion such as a cylinder. The two portions may be coupled to different parts of the marine device to harness wave energy. Typically, the different parts have relative motion caused by the wave energy and the mechanical energy transmission system 15 limits and harness that relative along the linear degree of freedom. A linear generator then couples to the two portions of the mechanical energy transmission system 15 and uses the relative motion of the two portions as input for electrical energy conversion.

Figure 6:
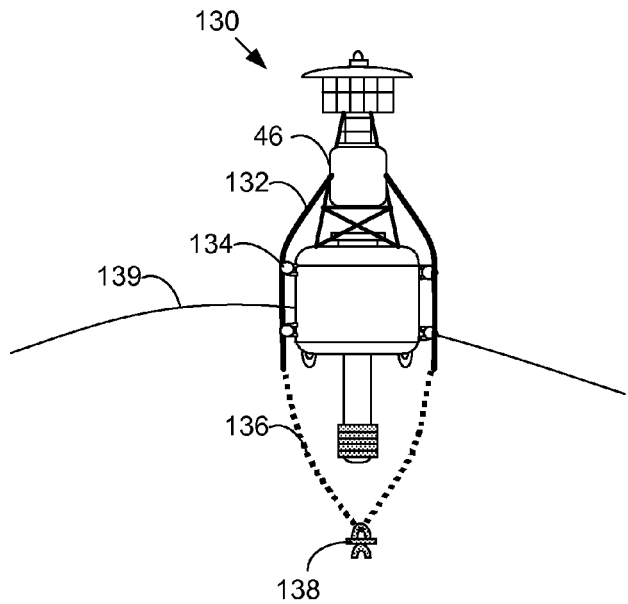

FIG. 6 shows a buoy 130 in accordance with another specific embodiment of the present invention.

Buoy 130 includes cables 132 that attach to the energy storage mass 64 in self-contained unit 46. Cables 132 may include a suitably stiff material, such as stainless steel, a chain or an abrasion resistant rope. As shown, cables 132 also extend to the mooring cables 136, which mechanically ground the buoy 130 and prevent it from floating away. Pulleys 134 are situated on the sides of buoy 130 to localize cable movement near the pulleys and reduce rotational forces on the buoy body.

When one or more of cables 132 is pulled taut by movement of buoy 130 relative to base 138 (typically as surface level 139 rises or at the wave high points and peaks of water surface 139), at least one of the cables 132 pulls down on mass 64. Up and down heaving of buoy 120 and/or the angular side-to-side rocking 16 of buoy 120 will then repeatedly cause one or more of cables 132 to displace mass 64 on its linear axis 66. The movement of energy storage mass 64 may then be converted to electrical energy. Since the cables now provide a propulsive force to storage mass 64, the mass can be reduced in size. In some cases, element 64 may be as simple as an attachment point that couples motion of a cable 132 to motion of an electrical generator element.

Figure 7:
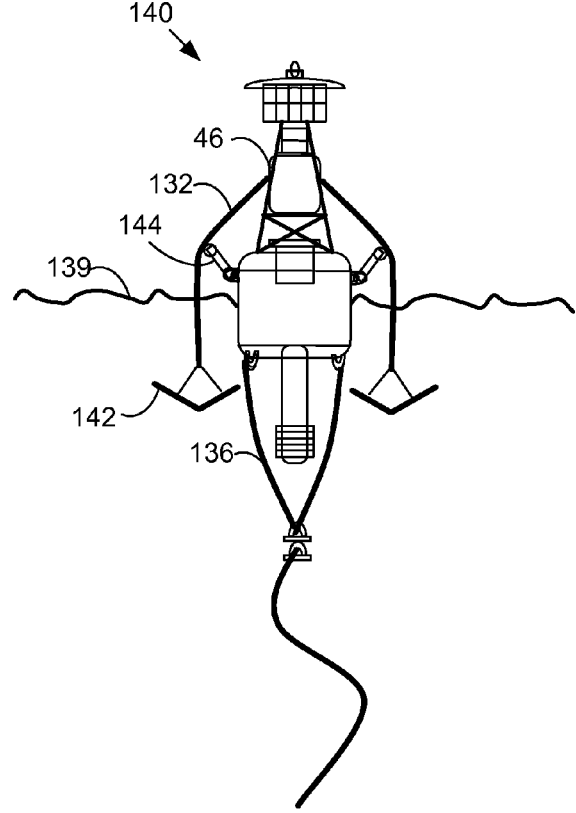

FIG. 7 shows a buoy 140 in accordance with another specific embodiment of the present invention. In this case, mechanical energy transmission system 15 includes cables 132 that indirectly attach the mass 64 (which again may be simply an attachment point) in system 15 to one or more water brakes 142. Pulleys 144 include stiff members that keep cables 132 distant from the body of buoy 140. Each water brake 142 includes a set of flat plates and a hinge that, together, act to resist upward movement but permit downward movement of the plates (with less water resistance since the hinge folds upwards and reduces surface area of the plates while moving downward). Water brakes 142 suitable for use herein are commercially available from Magma Products of Lakewood, Calif. Other devices that use a deformable cup shape, or a rigid cup in place of a hinged-mechanism are also suitable for use as a water brake and are commercially available.

Movement of buoy 140 in the water as surface level 139 changes causes relative motion between water brakes 142 and mass 64, which attaches to the cables, and production of electrical energy via the moving mass 64. In one embodiment, from 1 to about 6 water brakes 142 is suitable for use with buoy 140; each water brake 142 may include from 1 to about 4 cables. Another number of plates in water brakes 142 and cables 132 for each plate are also suitable for use.

Figure 8:
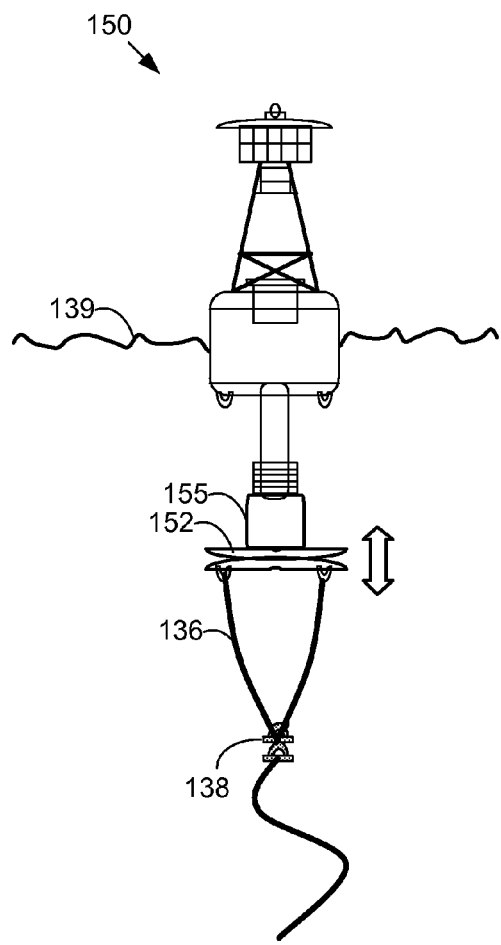

FIG. 8 shows a buoy 150 in accordance with another specific embodiment of the present invention. Buoy 150 includes a mechanical energy transmission mechanism 155 that is submerged below water line 139, and attaches directly to the bottom of buoy 150 and a water brake 152. In this case, water brake 152 includes a rigid plate (with no joints) that resists both upwards and downwards motion of buoy 150. Mooring cables 136 attach to the bottom of water brake 152. Mechanism 155 is configured in this case such that movement of buoy 150 relative to base 138 is slowed by brake 152 and causes a net displacement in a component (e.g., a plunger) in mechanical energy transmission mechanism 155 that also couples to the body and to an electrical generator 20.

Figure 9:
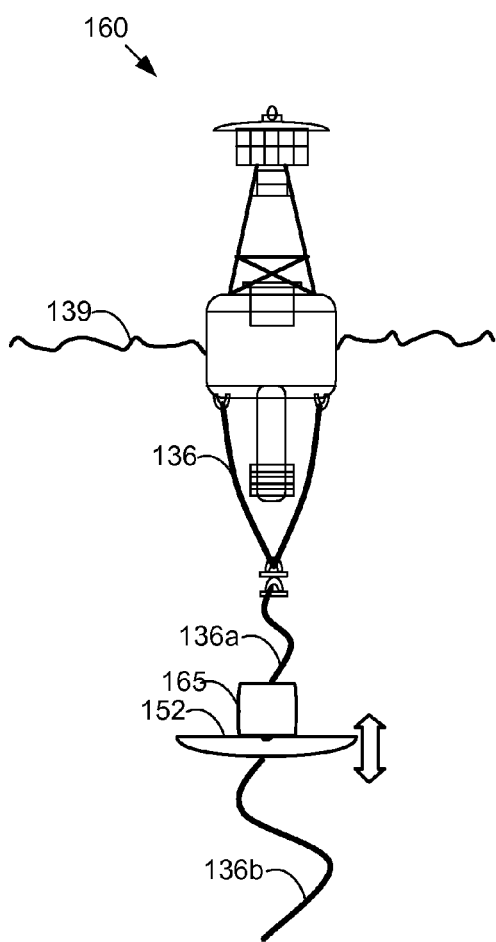

FIG. 9 shows a buoy 160 in accordance with another specific embodiment of the present invention. Buoy 160 includes a mechanical energy transmission mechanism 165 that is also submerged below water line 139, but attaches to the mooring cable system 136. Water brake 152 includes one or more rigid plates that resist both upwards and downwards motion of buoy 150. In this instance, a mooring cable 136a attaches to: a) buoy 160, and b) the top of mechanism 165, which attaches to water brake 152, which attaches to a second mooring cable 136b. Relative motion of buoy on water level 139 pulls on cable 136a, which moves mechanical coupling in mechanism 165 that attaches to an inlet of an electrical generator.

Mechanical to Electrical Conversion

Marine device 10 includes a generator that converts mechanical to electrical energy. The generator may include any suitable equipment to facilitate electrical energy generation, transmission and/or storage.

Figure 10:
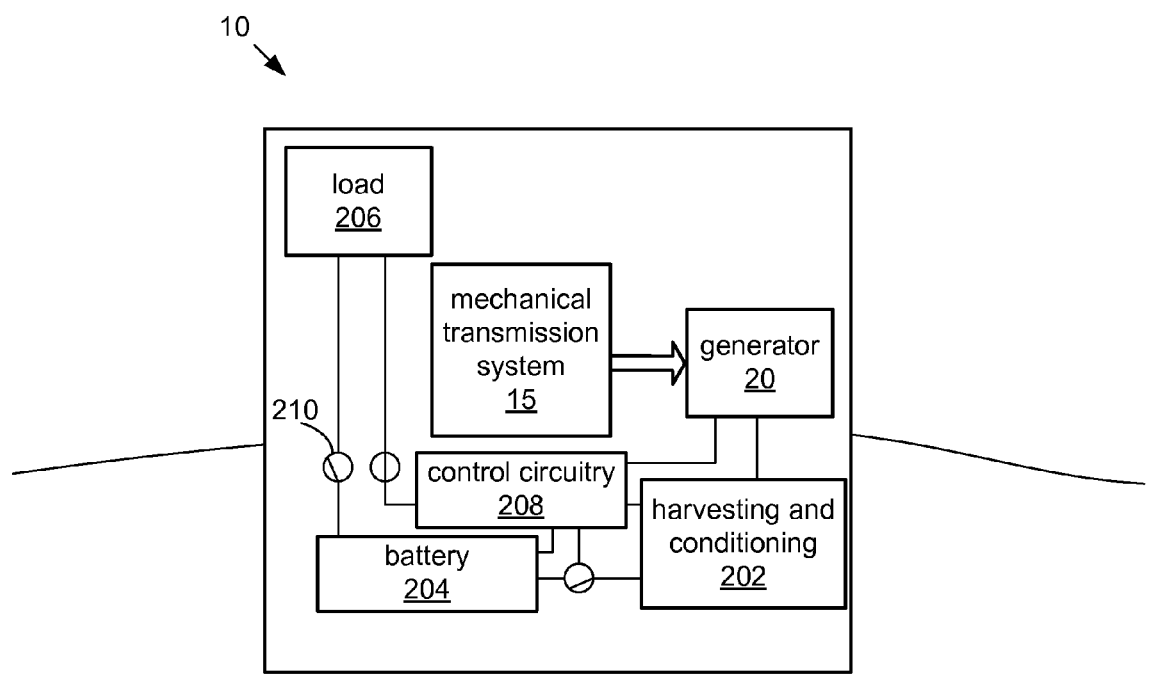
FIG. 10 shows a schematic illustration of a marine device in accordance with another embodiment of the present invention.

FIG. 10 shows a schematic illustration of a marine device 10 in accordance with another embodiment of the present invention. Marine device 10 includes generator 20, harvesting and conditioning circuitry 202, battery 204, load 206 and control circuitry 208.

Generator 20 is configured to receive mechanical energy and to output electrical energy. As one of skill in the art will appreciate, there are numerous technologies suitable for this task. In some instances, marine device 10 includes a conventional or commercially available generator 20 that uses electromagnetic induction to convert mechanical energy to electrical energy. Both AC and DC generators (or alternators) may be used. Rotary electromagnetic generators are common and often require rotary input of the input mechanical energy. Other types of electrical generators exist, based on other electrical phenomena such as piezoelectricity, and magnetohydrodynamics, and are suitable for use with marine device 10. Electroactive polymers are also well suited for use and described in further detail below.

In one embodiment, generator 20 is selected and configured to generate between about 5 joules and about 60 joules per stroke of a mass in mechanical energy transmission system 15. In a specific embodiment, generator 20 is selected and configured to generate between about 20 joules and about 30 joules per stroke of the mass. 20 joules per stroke translates to about 5 to about 10 watts of power at typical bay wave frequencies. Of course, the size of generator 20 will vary with the number of mechanical energy transmission systems 15 used, the size of the mass(es) in each system 15, amount of energy in the waves, wave period, desired electrical energy performance of marine device 10, etc.

Harvesting and conditioning circuitry 202 includes any circuitry configured to perform one or more of the following tasks: energy harvesting, voltage step-up or step-down, conversion between AC and DC power, smoothing voltage, priming the system with a voltage for startup, conditioning power output for an electrical load or the power grid, emergency shut-down, storing energy from the generator to provide output power during periods of low wave activity, communicating fault conditions (e.g. if the generator is not working properly), and adapting the system to compensate for unexpected or expected generator failure modes (e.g. loss of one of several electroactive polymer devices either unexpectedly or expected as a result of graceful lifetime decay. In some cases, harvesting and conditioning circuitry 202 includes circuits and software that allows components on marine device 10 to adapt to varying wave conditions, such as tuning stiffness in a mechanical energy transmission system 15 to obtain a dynamic absorber. Circuitry 202 may also be configured to efficiently harvest the energy from generator 20 despite unknown input frequencies and amplitudes, and that depend on the mechanical transmission system 15 and generator 20 selected. For example, an electroactive polymer may introduce nonlinear varying electrical properties that are managed by conditioning circuitry 202. Harvesting and conditioning circuitry 202 may also provide a small voltage for initial startup, if needed.

For electroactive polymers used in generator 20, harvesting and conditioning circuitry 202 may include circuitry designed to manage: high voltages, fast response times, polymer current loading and unloading, or other performance characteristics associated with electroactive polymers.

Battery 204 stores electrical energy for later use. Rechargeable batteries are thus well suited for use, such as any conventional and commercially available battery.

Load 206 generally includes any device or system that consumes electrical energy. Load 206 will vary with the marine device. For a navigation buoy, load 206 typically includes one or more lights. Other types of buoys may require energy to power sensors, computers and radio transmissions, for example. Marine generators deployed for electrical energy harvesting and provision onto a grid may include energy monitoring, device health monitoring, and/or communication resources.

Marine device 10 may also include control circuitry 208, which includes any combination of hardware and/or software for one or more controlling components on marine device 10. For example, control circuitry 208 may manage the power output between flashing lights 206 and recharging batteries 204.

Control circuitry 208 regulates switches 210, which control the movement of electrical energy in marine device 200. In one embodiment, control circuitry 208 includes a processor and memory, where the memory includes software with instructions that enable processor to execute methods of electrical energy generation described herein.

In one embodiment, the generator is partially or fully included in a self-contained unit 46. For example, one or more electroactive polymer transducer rolls may be attached to mass 64 in FIG. 3 and wrapped around axis 66; the electroactive polymer transducer rolls then get longer and shorter as the mass 64 moves. In another embodiment, a push rod or other mechanical coupling attaches to the mass 64, for example.

Electroactive Polymers

In one embodiment, the marine device employs an electroactive polymer transducer, with compliant electrodes coupled thereto, as a generator. The electroactive polymer transducer offers various design advantages compared with generators based on conventional technologies such as rotary electromagnetic generators operated through mechanical transmissions.

Dielectric elastomer transducers are one suitable type of electroactive polymer and include a relatively soft rubbery polymer disposed between two compliant electrodes. Dielectric elastomer transducers may operate in actuator mode, generator mode, and/or sensor mode, depending on configuration and their driving circuitry. The stiffness for an dielectric elastomer transducer may also be controlled.

Other types of electroactive polymers suitable for use herein include electostrictive polymers such as co-polymers of PVDF or semi-crystalline polyurethanes, piezoelectric polymers such as PVDF, ionically-conductive polymers, and liquid crystal elastomers.

Dielectric elastomers in the actuator mode convert electrical to mechanical energy because an electric field pressure (applied using the electrodes) acts to exert work on the material and load. Electrically, the actuator mode brings opposite charges closer together and like charges farther apart as the polymer film contracts in thickness and expands in area. These changes reduce the stored electrical energy, and the difference is converted to mechanical work. Further description of electroactive polymer actuation is provided in commonly owned U.S. Pat. No. 6,781,284, which is incorporated by reference herein in its entirety.

In the generator mode, electrical charge is placed on the electroactive polymer transducer in a stretched state. When the polymer contracts, elastic stresses in the film (which may be assisted by external loads) work against the electric field pressure of any charge on the electrodes, thus increasing electrical energy of the charge. On a microscopic level, charges on opposite electrodes separate as the film thickness increases, while like charges on the same electrode compress together as the polymer area contracts. Electrically, these changes raise the voltage of the charge, which increases (and generates) electrical energy. Further description of electroactive polymer generation is provided in commonly owned U.S. Pat. No. 6,768,246, which is incorporated by reference herein in its entirety.

Portions of an electroactive polymer device may also be configured to provide variable stiffness. As mentioned above, this may be used to tune a dynamic absorber to increase mechanical energy harvesting, reduce marine device 10 motion, and increase marine device 10 stability. Systems employing an electroactive polymer transducer offer several techniques for providing stiffness control. In one embodiment, open loop techniques are used to control stiffness of a device employing an electroactive polymer transducer, thereby providing simple designs that deliver a desired stiffness performance without sensor feedback. For example, control electronics in electrical communication with electrodes of the transducer may supply a substantially constant charge to the electrodes. Alternately, the control electronics may supply a substantially constant voltage to the electrodes. Closed-loop stiffness control may be used to adaptively tune a dynamic absorber—reactively and in real time—to the natural frequency in a marine device. Exemplary circuits for providing stiffness/damping control are provided in commonly owned U.S. Pat. No. 6,882,086.

Some electroactive polymer transducers include large strain capabilities that can be well matched to ocean wave motion allowing a robust mechanical conversion mechanism with few moving parts. Electroactive polymer transducers are well suited for low frequency or variable speed mechanical input. For these scenarios, conventional generators rely on transmissions with their added cost, complexity, and size, which may not be necessary for electroactive polymer transducers. Linear, as opposed to rotary motion, also favors electroactive polymer transducers. Electroactive polymer transducers are thus very useful when the mechanical input is intrinsically low frequency and/or variable speed, as in many marine environments.

For many electroactive polymer transducers, higher operating voltages increase the amount of energy that can be generated for a given amount of material. Voltages of 100 V to 5 kV, corresponding to electrical fields within the polymer of up to 100 MV/m or more, are typical. Electronic circuit designs have been developed for both stepping up low voltages to high voltages, and for stepping down high voltages to low voltages. Many basic circuit designs have been adapted from other applications, such as voltage conversion circuits for fluorescent lights, and are low cost and reliable.

Electroactive polymers can be implemented into a wide variety of transducers and devices. Exemplary devices include rolls, linear motion devices, and diaphragm devices. Many of these transducers, such as a roll, can package a large amount of material into a compact shape. U.S. Pat. No. 6,781,284 describes several transducers and devices suitable for use herein.

Figure 11A:
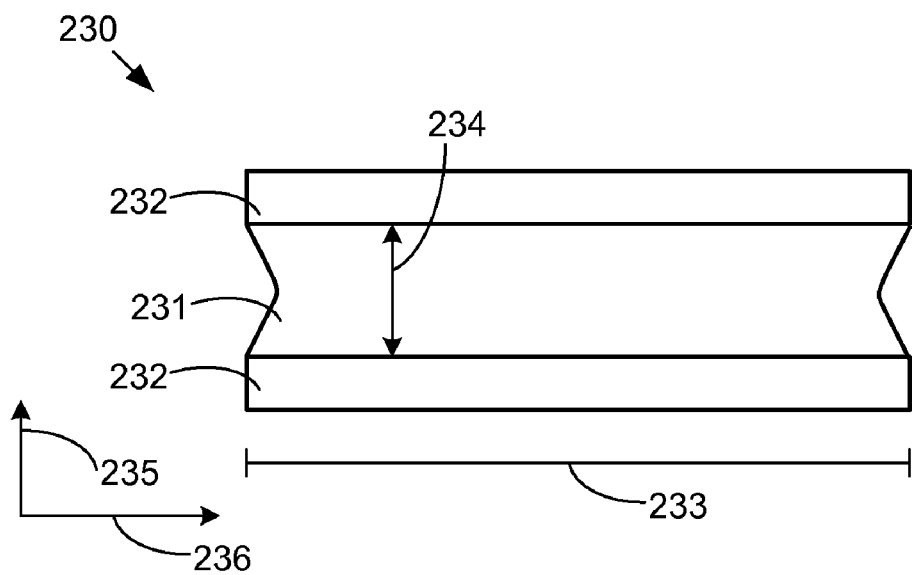
FIGS. 11A and 11B illustrate a linear motion device for converting between mechanical and electrical energy in accordance with a specific embodiment of the present invention.
Figure 11B:
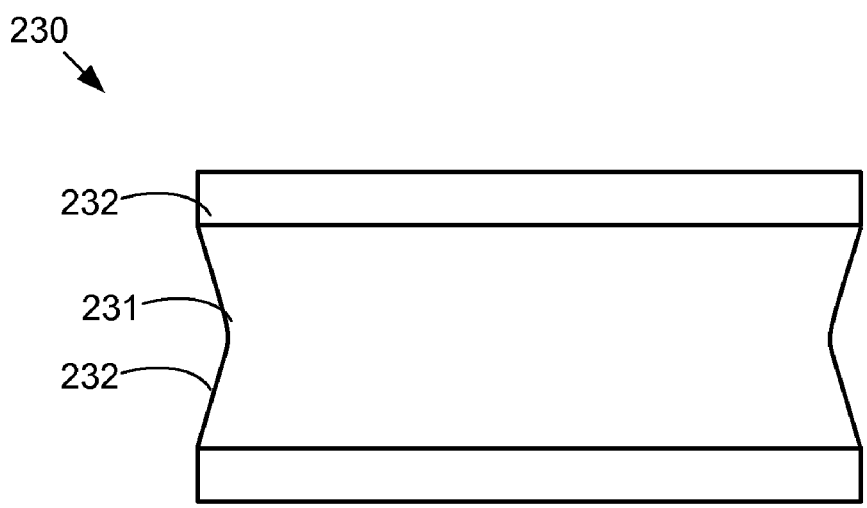

FIGS. 11A and 11B illustrate a linear motion device 230 for converting between mechanical and electrical energy in accordance with a specific embodiment of the present invention. Linear motion device 230 is a planar mechanism having mechanical translation in one direction, 235. The linear motion device 230 comprises an electroactive polymer 231 having a length 233 greater than its width 234. In a specific embodiment, polymer 231 includes a 2:1 length to width ratio.

Polymer 231 is attached on opposite sides to stiff members 232 of a frame along its length 233. Stiff members 232 have a greater stiffness than the polymer 231. The geometric edge constraint provided by stiff members 232 prevents displacement in a direction 236 along polymer length 233 and facilitates deflection in direction 235. In some dielectric elastomers, such as acrylics, it is desirable to prestrain the polymer material in order to get it to the desired thickness and stiffness. When linear motion device 230 is implemented with a polymer 231 having anisotropic pre-strain, such as a higher pre-strain in the direction 236 than in the direction 235, then polymer 231 is stiffer in the direction 236 than in direction 235 and large deflections in direction 235 are permissible. By way of example, such an arrangement may produce linear strains of at least about 200 percent for acrylics having an anisotropic pre-strain.

Linear motion device 230 is well suited to receive motion of energy storage mass 64 along a linear slide 66 in self-contained unit 46 of FIG. 3, for example. Charge is then added to and removed by control circuitry according to the position of mass 64 as it stretches and contracts polymer 231.

Figure 12A:
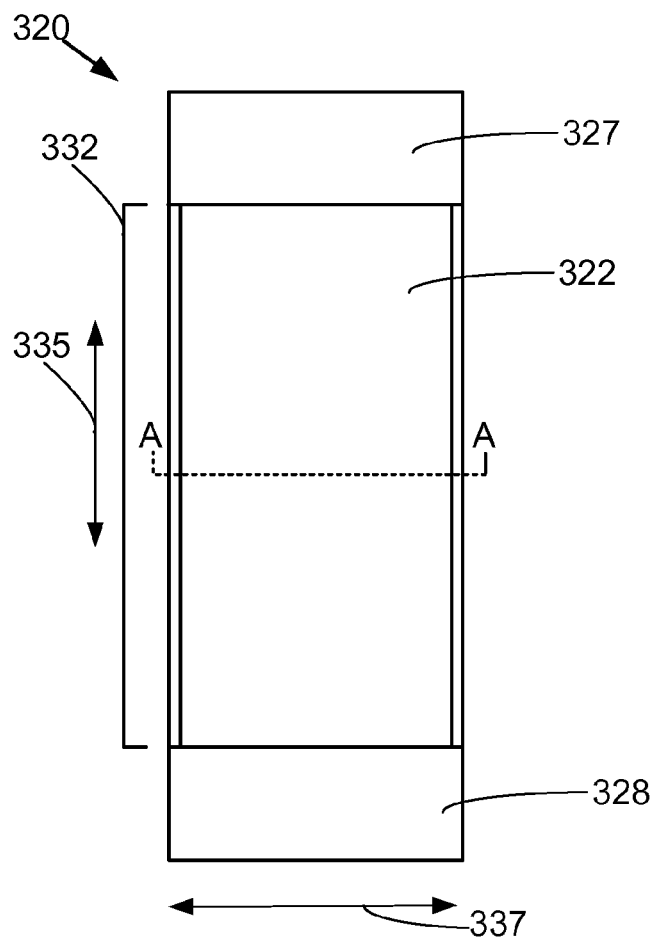
FIGS. 12A-12C show a rolled electroactive polymer device suitable for mechanical to electrical energy conversion in accordance with a specific embodiment of the present invention.
Figure 12B:
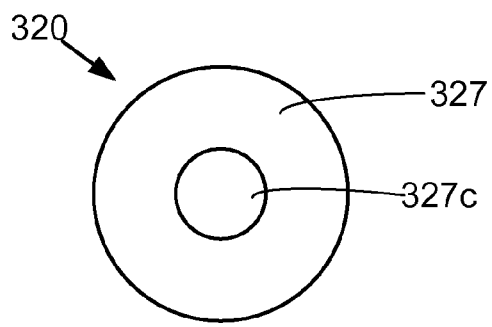
Figure 12C:
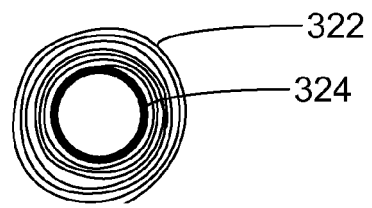

Electroactive polymers may also be rolled to increase the amount of polymer in a confined space. FIGS. 12A-12C show a rolled electroactive polymer device 320 suitable for mechanical to electrical energy conversion in accordance with a specific embodiment of the present invention. FIG. 12A illustrates a side view of device 320; FIG. 12B illustrates an axial view of device 320 from its top end; FIG. 12C illustrates an axial view of device 320 taken through cross section A-A. Device 320 comprises a rolled electroactive polymer 322, end pieces 327 and 328, and spring 324.

FIG. 12C shows the rolled layering of electroactive polymer 322. A rolled electroactive polymer may include an electroactive polymer with, or without electrodes, wrapped round and round onto itself (e.g., like a scrolled poster) or wrapped around another object (e.g., spring 324). For single electroactive polymer layer construction, a rolled electroactive polymer of the present invention may comprise between about 2 and about 200 layers. Polymer 322 and spring 324 are capable of axial deflection between their respective bottom top portions.

End pieces 327 and 328 are attached to opposite ends of rolled electroactive polymer 322 and spring 324. Endpiece 327 has an inner hole 327*c* that includes an internal thread capable of threaded interface and detachable mechanical attachment with a threaded member, such as a screw or threaded bolt.

Many electroactive polymers perform better when prestrained. For example, some polymers exhibit a higher breakdown electric field strength, electrically actuated strain, and energy density when prestrained. Spring 324 of device 320 provides forces that result in both circumferential and axial prestrain for polymer 322. Spring 324 is a compression spring that provides an outward force in opposing axial directions (FIG. 12A) that axially stretches polymer 322 and strains polymer 322 in an axial direction. Thus, spring 324 holds polymer 322 in tension in axial direction 335.

Rolled electroactive polymer devices allow for compact electroactive polymer device designs. The rolled devices provide a potentially high electroactive polymer-to-structure weight ratio, and can be configured to actuate in many ways including linear axial extension/contraction, bending, and multi-degree of freedom actuators that combine both extension and bending. A rolled electroactive polymer is well suited for use in self-contained unit 46 of FIG. 3. The polymer may be wrapped around the energy storage mass 64 and linear slide 66, which provides a compact form factor for self-contained unit 46 with numerous layers of electroactive polymer.

Other electroactive polymer devices are also suitable for use herein. In general, electroactive polymer transducers are not limited to any particular geometry or linear deflection. For example, a polymer and electrodes may be formed into any geometry or shape including tubes and rolls, stretched polymers attached between multiple rigid structures, stretched polymers attached across a frame of any geometry—including curved or complex geometries, across a frame having one or more joints, etc. Deflection of a transducer according to the present invention includes linear expansion and compression in one or more directions, bending, axial deflection when the polymer is rolled, deflection out of a hole provided in a substrate, etc. Deflection of a transducer may be affected by how the polymer is constrained by a frame or rigid structures attached to the polymer.

In one embodiment, marine device 10 uses one or more commercially available electroactive polymer devices, such as those available from Artificial Muscle (AMI) of Menlo Park, Calif. In particular, AMI provides a universal muscle actuator, which is suitable for use herein. The universal muscle actuator includes two opposing diaphragm actuators attached to a common central platform. The narrow annular area of each diaphragm effectively couples much of the actuation stress to the central platform. Universal muscle actuators have been made in a range of sizes. The number of layers of the diaphragms may vary as well. While developed as an actuator, the universal muscle actuator may also operate as a generator. A universal muscle actuator employed as a generator may include a larger diameter to allow for the needed energy output.

A collection of electroactive polymer devices may be mechanically linked to form a larger generator with a common output, e.g. force and/or displacement. By using a small electroactive polymer as a base unit in a collection, conversion between electric energy and mechanical energy may be scaled according to an application by connecting many individual elements in parallel or series.

The buoy-mounted generator design of FIG. 5 may employ a long and narrow form factor for the electroactive polymer device(s). Vertically stacked electroactive polymer devices, such as rolled devices or universal muscle actuators, are two suitable electroactive polymer approaches with such a long and narrow form factor. This approach is also suitable for use in mooring cables where the electroactive polymer device is disposed along the mooring cable and protected by a sheath.

The amount of electroactive polymer included in a marine device will depend on the amount of desired power for the marine device. In one embodiment, about 1 meter square of electroactive polymer film is used for each watt of power output desired. Thus, for typical wave frequencies, a 25-watt generator would employ about 25 m$^2$ of electroactive polymer. If, for example, the marine device 40 of FIG. 3 uses universal muscle actuators with an outer diameter of 30 centimeters and an inner diameter of 10 centimeters, each single-layer universal muscle actuator is about 0.063 m$^2$. This amounts to about 400 of these devices for 25 watts. Alternatively, if each universal muscle actuator includes ten layers of electroactive polymer, then the marine device 40 of FIG. 3 may only use 40 UMA devices. For the four self-contained unit 46 design of marine device 120 of FIG. 5, then each unit 46 only contain 10 universal muscle actuator devices.

In order to increase energy density with dielectric elastomers, energy generation may be typically done at high voltage (1 kV or more). In one embodiment, an electroactive polymer generator system that is used to recharge a battery, for example, includes both step-up and step-down voltage conversion. Suitable description of step-up and step-down voltage conversion suitable for use with electroactive polymer generation is provided in commonly owned U.S. Pat. No. 6,768,246. This circuitry may be added to harvesting and conditioning circuitry 202 of FIG. 10.

Electroactive polymer generators may employ harvesting and conditioning circuitry 202 configured for their electrical performance. Two suitable circuit designs include inductive circuits and capacitive circuits. In this case, circuitry 202 harvests and conditions the energy provided by AC swings in electroactive polymer voltage and energy using inductive and/or capacitive elements. In general, electroactive polymer generator circuits are designed so that, at least on average and ideally throughout the cycle, the electroactive polymer voltage at a given electroactive polymer strain is lower when it is expanding than when it is contracting.

Inductive circuits switch stored electrical energy in an electroactive polymer back and forth between a buffer capacitor and through an inductor at the appropriate time in the generator's cycle. The electroactive polymer acts as a capacitor in this case. As one of skill in the art will appreciate, directly switching the energy from one capacitor at higher voltage to another capacitor at lower voltage is inefficient unless the two capacitors happen to be close in voltage. By using an inductor in the circuit, transfer of energy between capacitors at different voltages may be accomplished efficiently, even when they are at greatly different voltages. The inductor circuit works by initially charging the buffer capacitor and electroactive polymer to a nominal, low level. The buffer capacitor is typically much larger in capacitance than the expected peak electroactive polymer capacitance. When the electroactive polymer is stretched, its voltage drops and one switch is closed to allow charge and energy from the buffer capacitor to flow into the electroactive polymer through the inductor. A diode may be used to prevent back flow of energy. The electroactive polymer is then contracted by the external mechanical wave energy and mechanical energy transmission system, thereby reducing its capacitance and increasing both the voltage and energy on the electroactive polymer. A second switch (on a second conduction path) is then closed to allow energy and charge to flow from the electroactive polymer (which now has a higher voltage than the buffer capacitor), through the inductor, and into the buffer capacitor. A second diode may be used to prevent back-flow through the second conduction path. The inductor efficiently transfers the energy, including the increase in electrical electroactive polymer energy from contraction, to the buffer capacitor. To do this, a third diode is provided to allow the inductor to pull additional charge up from ground (or the low or negative side of the circuit) to the high side of the buffer capacitor in a manner analogous to a buck circuit known to one of skill in the art. If the energy gain of the electroactive polymer from contraction was sufficient to overcome parasitic losses in the circuit, the buffer capacitor gains an increase in stored electrical energy. This additional electrical energy can be used to power a load, or used to further raise the voltage of both the buffer capacitor and electroactive polymer to reach a more optimal operating point. The switches in this circuit can be transistor switches, mechanical switches, or other efficient switches known to one of skill in the art.

Capacitive circuits may be designed and implemented in various ways. One simple version uses a coupling capacitor in electrical communication with the high side of an electroactive polymer on one terminal, and the high side of a buffer capacitor on the other side of the terminal. A first diode prevents backflow of energy from the coupling capacitor to the buffer capacitor. A second diode connects from ground directly to the coupling capacitor's terminal opposite the electroactive polymer (i.e., to the same terminal that connects to the first diode but between the first diode and the coupling capacitor). With this arrangement, when the electroactive polymer side of the coupling capacitor is exposed to AC voltage (provided by the stretching and contracting of the charged electroactive polymer), the opposite side of the coupling capacitor pulls charge up from ground when the electroactive polymer side goes low in voltage (electroactive polymer stretched), and pushes charge onto the buffer capacitor when the electroactive polymer side goes high in voltage (electroactive polymer contracted). The circuit acts like a charge pump. To maintain electroactive polymer charge in the presence of parasitic losses (such as leakage through the electroactive polymer), a third diode can be connected to the high side of the electroactive polymer from the buffer capacitor to allow charge to flow onto the electroactive polymer whenever its voltage drops below the buffer capacitor voltage. With this arrangement, if no charge is taken off the buffer capacitor and the electroactive polymer energy gain is sufficient, the buffer capacitor will increase in voltage as the electroactive polymer is cycled, and the third diode allows the electroactive polymer to increase overall voltage correspondingly. The system becomes self-pumping, and only requires a small amount of initially input energy and voltage to reach a high voltage and stored energy. This can be provided, for example, by a battery, and a fourth diode can be used to prevent backflow to the battery. Once the buffer capacitor and a fourth diode reach a desired operating voltage, various additional circuits may withdraw energy from the buffer capacitor to maintain a desired power output without an additional increase in overall system voltage. Many modifications are possible with this circuit, such as additional stages of charge pumping to allow self-pumping even when the various additional circuits voltage gain or AC amplitude is small. Another useful embodiment is to include series capacitors in place of the buffer capacitor with appropriate switching and diodes to provide lower voltage output, or to connect the buffer capacitor to an inductive step-down buck circuit for the same function.

Harvesting and conditioning circuitry 202 for an inductive circuit switches the electroactive polymer voltage on/off. This switching may be done with mechanical contacts or electrically with a control signal, for example. The mechanical contacts may be arranged at maximum and minimum stroke positions to automatically inform the system of stroke status at these points. Switching with high-voltage transistors is also suitable. Sensors that indicate when the electroactive polymer is at its extreme positions may also be used.

The inductive circuit works more efficiently when the electroactive polymer stretches and contracts a large amount. Various mechanical transmission schemes and/or electrical tuning can be configured to help one or more electroactive polymers operate at large strain conditions. For example, a mechanical energy transmission system 15 may be configured to allow for lower stiffness and fast electroactive polymer response.

Figure 13A:
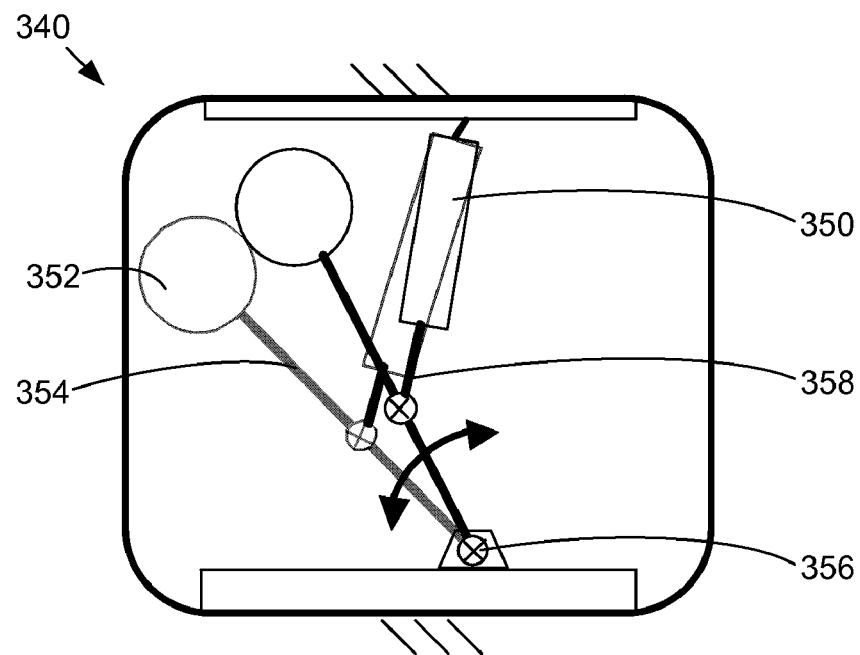
FIGS. 13A and 13B show a self-contained unit that includes a mechanical energy transmission system with a swinging mass designed for use with an electroactive polymer generator in accordance with a specific embodiment of the present invention.
Figure 13B:
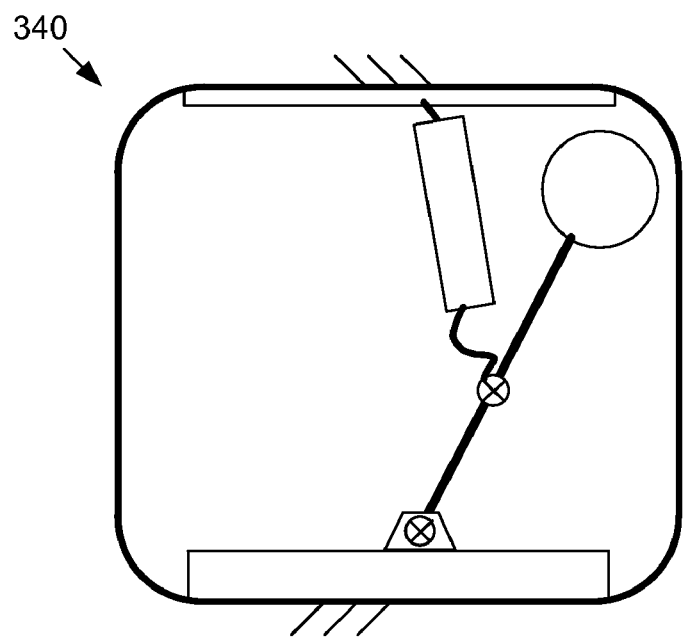

FIGS. 13A and 13B show a self-contained unit 340 that includes a mechanical energy transmission system with a swinging mass 352 designed for use with an electroactive polymer generator 350 in accordance with a specific embodiment of the present invention.

In this case, movement of the marine device results in back and forth swinging of mass 352 about a pivot 356. Self-contained unit 340 provides a negative spring constant using an inverted pendulum or over-center mechanism when a spring is added. Electroactive polymer 350 couples to a pendulum arm 354, attached to mass 352, such that electroactive polymer 350 deflects as mass 352 swings. Deflection of electroactive polymer 350 is used to generate electrical energy. Also, electroactive polymer 350 provides stiffness to the system, including a controllable stiffness in some embodiments, as described above.

This self-contained unit 340 converts both up and down and tilting (or rocking) motion of a marine device 10 in the water into motion of mass 352. In other words, self-contained unit 340 provides a means of coupling angular and lateral motion (in addition to vertical motion) in a single device. Self-contained unit 340 also provides frequency doubling (the electroactive polymer 350 stretches and relaxes twice when the pendulum goes through top point), which is of use in low frequency wave environments. A slack cable 358, attached to inverted pendulum, adds a non-linear spring that allows for fast expansion and contraction of electroactive polymer 350, thereby reducing leakage losses in the electroactive polymer. Frequency doubling allows a single wave cycle to produce two cycles of expansion and contraction of the electroactive polymer 350. Thus, only half the amount of electroactive polymer material would be needed to produce the same power output (alternatively the same amount of material could be operated at a lower voltage or strain).

The electrical power generated by an electroactive polymer generator is typically at high voltage. The high voltage electrical energy can be: used directly (such as for flashing lights), stored at a high voltage on a capacitor, and/or to recharge batteries. The electronic generation circuit may also include the ability to step-down the high voltage. A simple inductive step-down circuit known as a "buck" circuit is suitable for step-down in many instances.

Other Marine Devices

This section describes other marine devices and applications that may benefit from a mechanical energy transmission system 15 and generator 20.

One such marine device is a marine generator deployed specifically for electrical energy production. For generators located near a shore, wave power can be used to supply energy to installations located near the shore. These installations might include navigational lighting located on seawalls or breakwaters. The electricity could also be used to supply industries that are located near the shore or on islands and thus relieve the need to transmit electricity long distances or over water. Wave power, since it does not require any fuel source or produce any effluents, can also be used to supply clean energy for general needs.

The location of the wave power electrical generation device near an existing or planned breakwater or seawall is attractive because the functions are complementary. The wave power device will tend to calm the waves hitting the seawall or breakwater. The breakwater or seawall can help amplify the waves of the device since some waves are reflected. The seawall or breakwater also can serve as a desirable anchor point for the generator device.

In one specific application, the marine device is a floating breakwater generation device that harvests power in large waves found in deep-water areas of a coastline or near an existing breakwater or similar seawall structure in shallower waters. For the Japanese coastline for example, these waves frequently include a 2-meter peak-to-trough average wave height with a 7 to 8 second period. A marine generator as described herein may also be located adjacent to existing or specially made seawalls and breakwaters in other locations. Because of its location, the marine generator may also help protect the seawall or breakwater from erosion.

Electrical power from the generator may be used to power navigational lighting on the nearby seawall or breakwater—or used for a variety of general needs, such as supply onto an electrical grid. For supply onto a grid, the marine device also includes a tether or other form of electrical communication that transports the generated electrical energy from the floating marine device to a gird connection. The power may also be used to power other marine or aviation navigational aids, generate power for nearby buildings, or for transmission to more remote locations.

Figure 14:
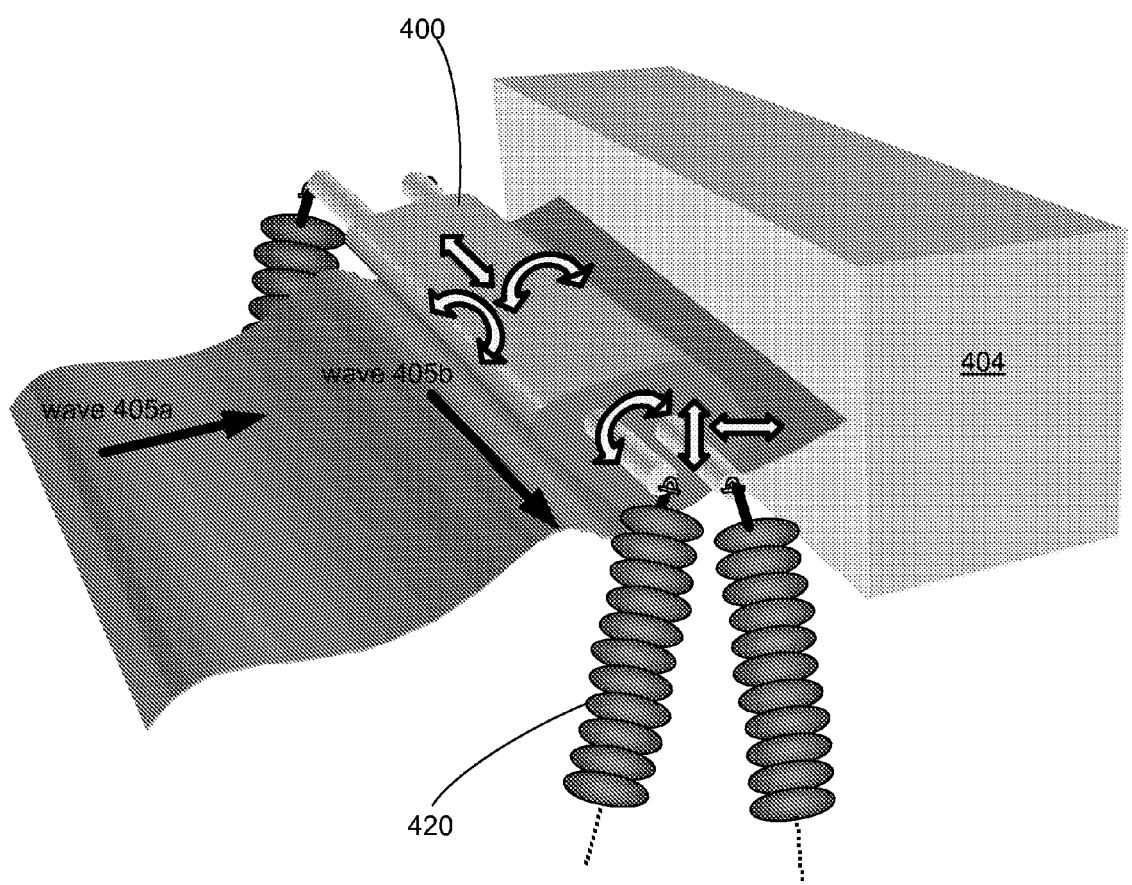
FIG. 14 shows marine device in front of a sea wall and configured to receive an incoming wave normal to an axis of the marine device.
Figure 15A:
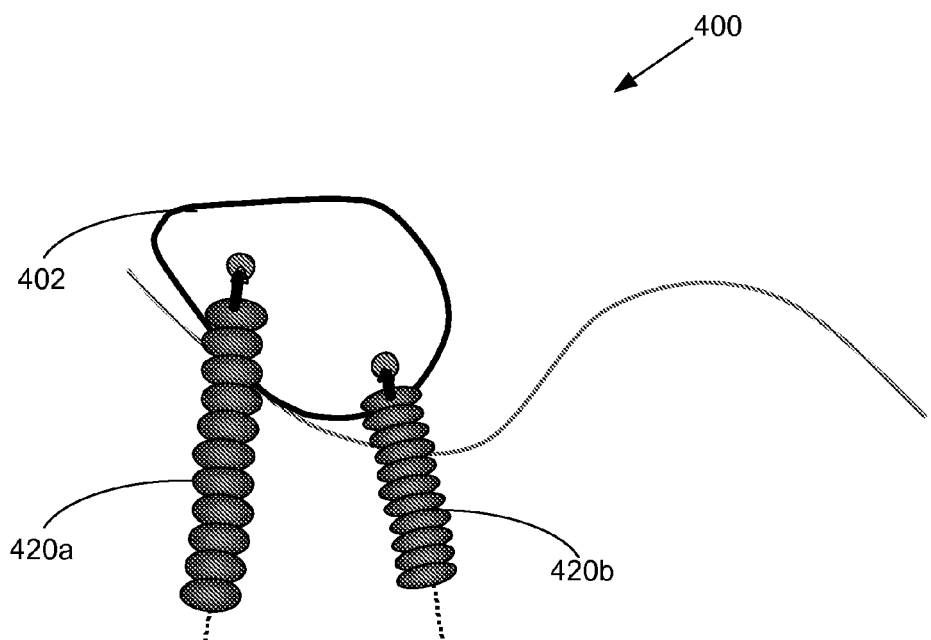
FIGS. 15A and 15B show marine device with mooring lines in two rotational positions in accordance with a specific embodiment of the present invention.
Figure 15B:
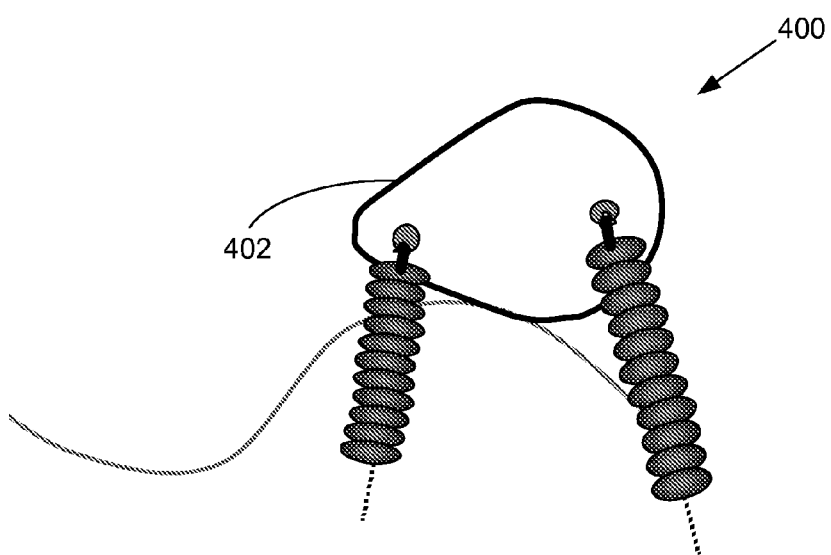

FIGS. 14-15 show a marine device 400 in accordance with a specific embodiment of the present invention. FIG. 14 shows marine device 400 in front of a sea wall 404 and configured to receive an incoming wave 405a normal to a long axis of the marine device 400. FIGS. 15A and 15B show marine device 400 with mooring lines 420 for two rotational positions of marine device 400 in accordance with a specific embodiment of the present invention.

As mentioned above, many marine devices described herein may include a mechanical transmission system that does not include an energy storage mass that moves relative to the body for electrical energy harvesting. In this case, the breakwater generator device 400 generates electrical energy using wave power, and includes a mechanical energy conversion system that includes a floatation chamber 402 coupled to mooring lines 420.

Flotation chamber 402 is configured such that device 400 at least partially floats on water. Flotation chamber 402 converts the wave energy into mechanical energy along one or more known directions, namely, the rotation of flotation chamber 402 about its long axis (normal to the page in FIG. 15A). Flotation chamber 402 may include an inflatable plastic or foam coated with concrete or plastic, for example. The outer shape of flotation chamber 402 reacts to wave motion and changes in the surface level of water on which the generator device 400 floats. In this case, flotation chamber 402 includes an axial profile shown in FIG. 15a that reacts to water surface level changes moving normal to the axis (see FIG. 14). An incoming wave thus causes flotation chamber 402 to rotate about its long axis and tilt back and forth, as shown in FIGS. 15A and 15B.

Mooring lines 420 attach to front and back portions of flotation chamber 402 on opposite sides of the center of mass of flotation chamber 402. Rotation of flotation chamber 402 about its axis causes mooring lines 420 to stretch and contract (see FIGS. 15A and 15B). In a specific embodiment, mooring lines 420 couple to an electromagnetic electrical energy generation system. For example, mooring lines 420 may couple to electromagnetic generators at the sea floor where they are anchored. In another specific embodiment, mooring lines 420 each include one or more electroactive polymer generators that convert linear deflection of mooring lines 420 into electrical energy. In this case, and as shown in FIG. 15A, mooring lines 420 include a rigid cable that couples to the bottom of an electroactive polymer device that couples at it top end to another rigid cable and flotation chamber 402. Rolled electroactive polymers are suitable for use in mooring lines 420. Concatenated electroactive polymers may also be stacked in series to provide electroactive polymer devices with lesser length. In this case, a rubber or metal sealed bellows may be added to mooring lines 420 to cover, seal and protect the electroactive polymer devices.

By using mooring lines 420a and 420b on opposing sides of each flotation chamber 402 (see FIG. 15A), and on opposing ends (see FIG. 14), the electroactive polymer devices can stretch and contract with several different motions of chamber 402 (height increase, rolling and tilting, for both incoming waves 405a and transverse waves 405b, etc.), allowing device 400 to generate power with almost any wave direction and water surface level change.

Figure 16A:
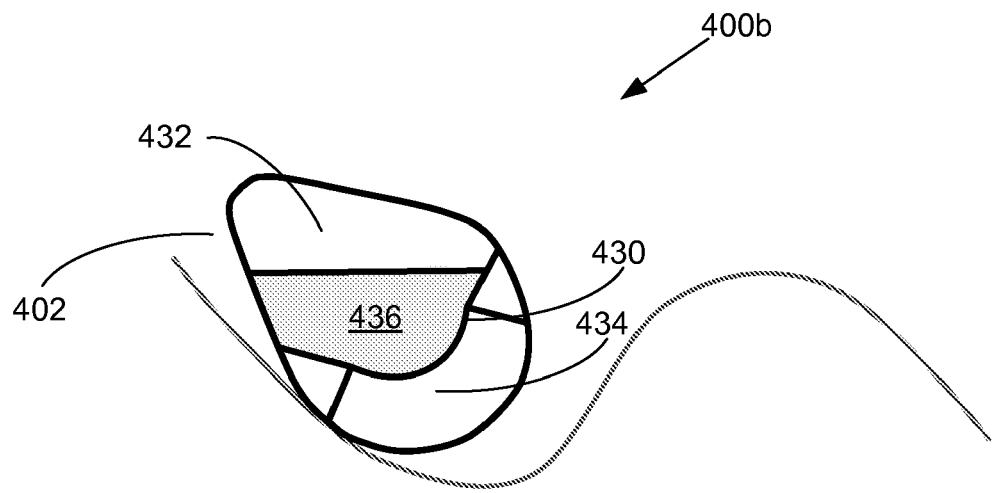
FIGS. 16A and 16B show a marine device in two rotational positions in accordance with another specific embodiment of the present invention.
Figure 16B:
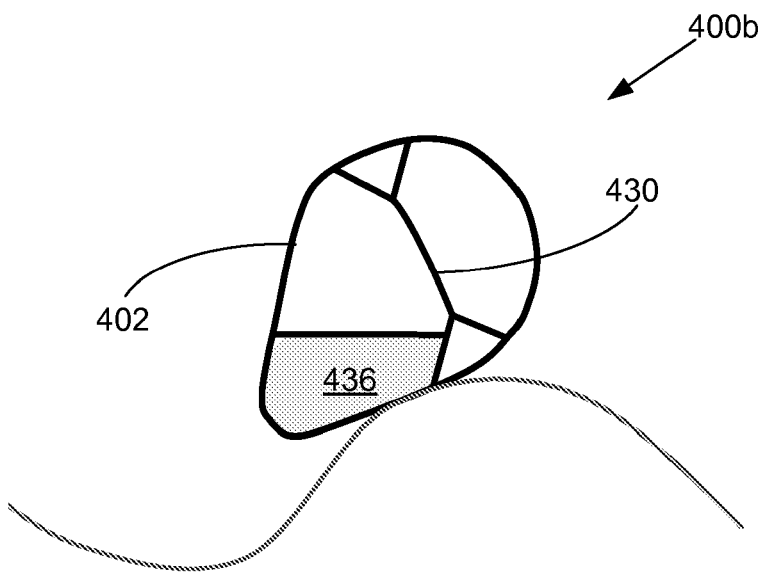

FIGS. 16A and 16B show a marine device 400b in two rotational positions in accordance with another specific embodiment of the present invention. Marine generator 400b includes an internal electroactive polymer 430 that separates two internal cavities 432 and 434. Internal cavity 432 includes a liquid 436, such as water. Rotation of marine device 400b—in response to changing surface levels of the water or a passing wave as shown—causes the marine device 400b to rotate and liquid 436 to move in chamber 432 so as to intermittently push on electroactive polymer 430 (FIG. 16A), which causes polymer 430 to expand.

Electrical control circuitry then monitors the state of deflection of polymer 430, and adds and removes current to and from polymer 430 according to the deflection state of polymer 430. In a specific embodiment, the electroactive polymer 430 communicates with circuitry that senses the deflection state of polymer 430. Sensing using an electroactive polymer is described in commonly owned U.S. Pat. No. 6,809,462, which is also incorporated by reference in its entirety herein for all purposes.

Another embodiment of marine device 400b includes liquid 436 in the second cavity 434. This allows the liquid 436 to push on polymer 430 when in the position shown in FIG. 16B, which powers polymer 430 for rotational movement of marine device 400 in both clockwise and counterclockwise directions.

In another embodiment of marine device 400b, internal cavities 432 and 434 form outer cavities about an inner cavity in marine device 400b that internally includes liquid 436. In some cases, this may double mechanical energy transmitted to the polymer (and potentially double the electrical energy harvested).

A marine generator 400 may include both electroactive polymer 430 and mooring lines 420. This allows the device 400 to generate electrical energy for almost any chamber 402 motion including any translation or rotation of the device. This includes waves that move normal 405a to the wall 404 from the front or reflect from behind, as well as transverse waves 405b (FIG. 14).

In another embodiment using a movable liquid, the rotation of the device 400b causes the liquid 436 to flow through a turbine attached to a conventional rotary electromagnetic generator.

Figure 17A:
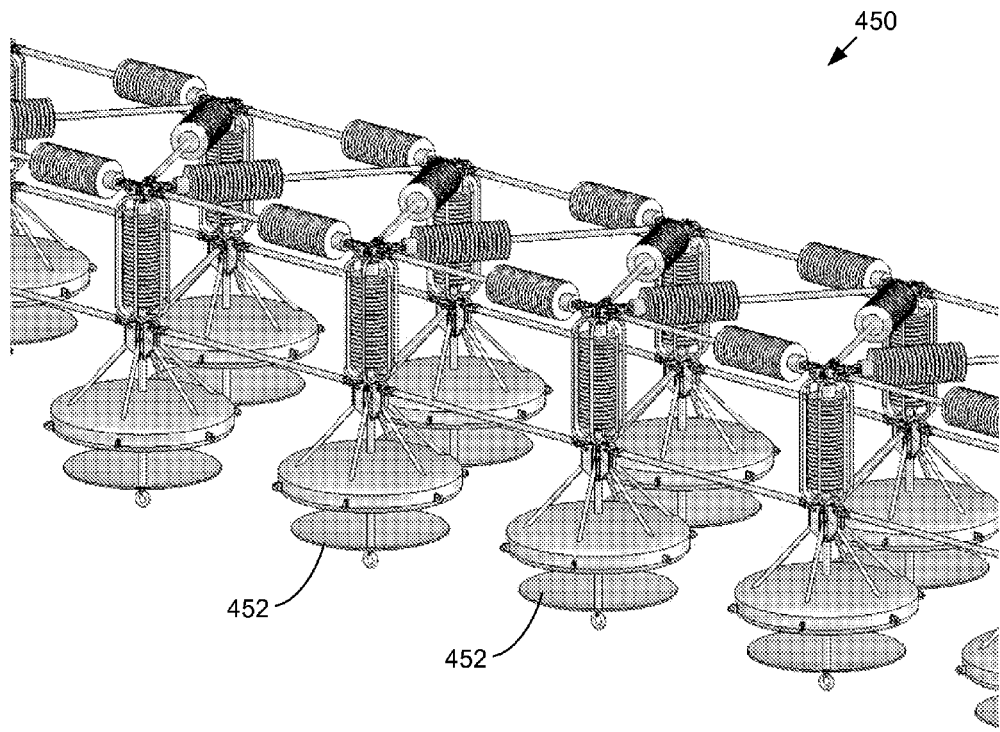
FIGS. 17A-17C show a breakwater generator system in accordance with another embodiment of the present invention.
Figure 17B:
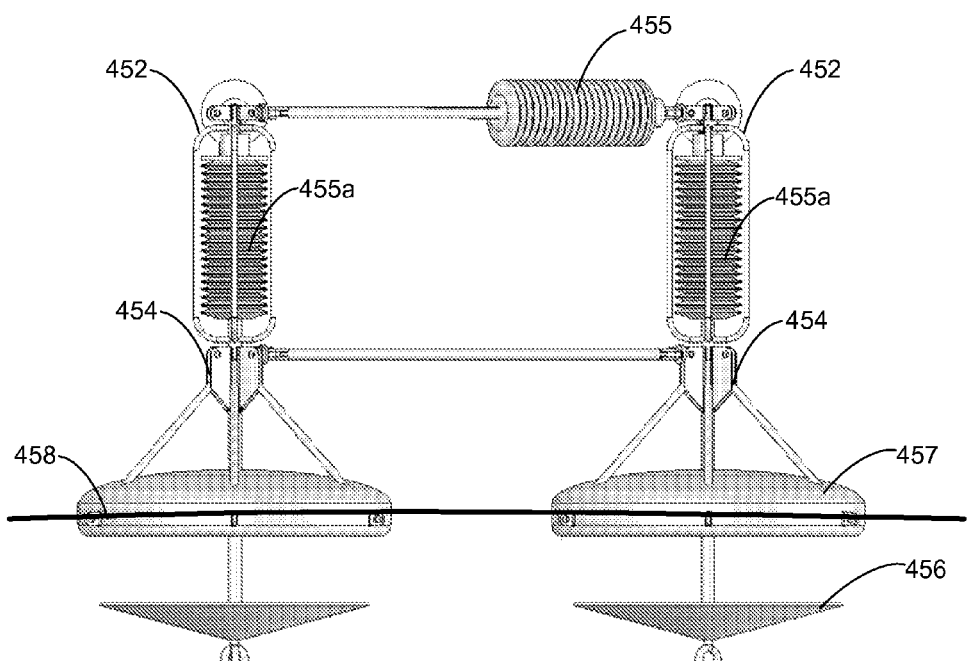
Figure 17C:
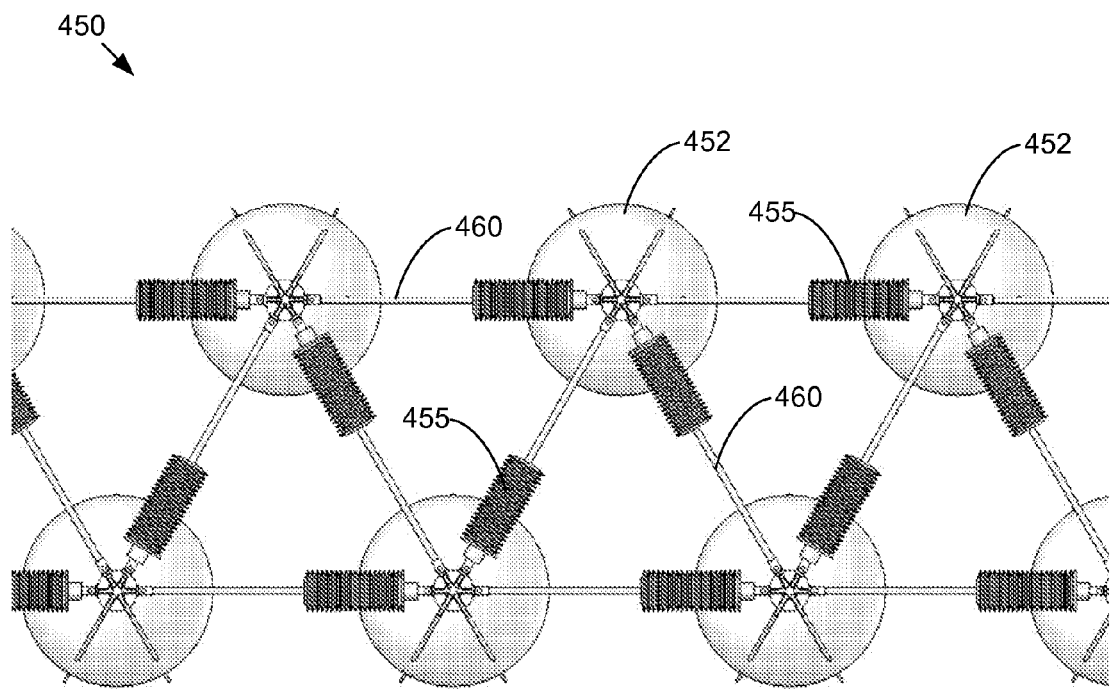

FIGS. 17A-17C show a breakwater generator system 450 in accordance with another embodiment of the present invention. FIG. 17A shows a perspective view of system 450; FIG. 17B shows a side view of two adjacent generators 452 used in system 450; and FIG. 17C shows a top view of interconnection between generators 452 in system 450.

Referring first to FIG. 17B, each generator 452 includes a frame 454, water brake 456, float 457, and at least one mechanical energy transmission system 455.

Water brake 456 attaches to a bottom portion of frame 454, rests under water surface level 458 when the generator is deployed, and resists vertical motion of each generator 452.

Mechanical energy transmission system 455a is vertically aligned with respect to frame 454 and includes a portion that mechanically couples to water brake 456 and a second portion that mechanically couples to a portion of frame 454 that rests above the water surface level 458. A changing water surface level 458 creates differential vertical motion in mechanical energy transmission system 455a, and a generator attached thereto. In one embodiment, mechanical energy transmission system 455a includes a rod that mechanically couples to water brake 456 and vertically translates relative to frame 454. This relative motion is used to generate electrical energy with a generator coupled to a portion of mechanical energy transmission system 455. For example, one portion of an electroactive polymer may be coupled to the rod in mechanical energy transmission system 455 while another portion of the electroactive polymer couples a stationary portion of mechanical energy transmission system 455 (stationary relative to frame 454) or to frame 454. In a specific embodiment, frame 454 includes a metal or stiff plastic, while water brake 456 may include coated styrofoam, a metal, stiff polymer, fiberglass or cement for example.

Generator system 450 also harvests relative motion between generators 452. A lattice structure mechanically couples generators 452 in system 450, and is shown from the top in FIG. 17C. The lattice structure includes an array of connectors 460. In this case, the connectors 460 are linear and couple two adjacent generators 452; other connection designs are also suitable for use. One or more linear connector 460 in the lattice structure includes a mechanical energy transmission system 455 that couples to two adjacent generators 452 such that relative motion between the adjacent two generators 452 deflects two portions of the mechanical energy transmission system 455 with relative motion. For example, a rod or one end of transmission system 455 may mechanically couple to the frame 454 of a first generator 452 while a plunger or the other end of transmission system 455 mechanically couples to the frame 454 of a second adjacent generator 452. Relative lateral motion between the adjacent generators 452 then causes deflection in mechanical energy transmission system 455, which may then be harvested along its known deflection for electrical energy production.

The lattice in system 450 is suitable to capture motion via: a) relative lateral motion between generators 452 (e.g., in a plane horizontal to the water), b) relative rocking motion between generators 452, c) relative vertical motion between generators 452, and d) combinations thereof. Since wave motion is generally unpredictable, an advantage of system 450 is that it harvest three dimensional motion in the waves regardless of the direction of motion, which allows the system to harvest wave energy despite the unpredictability of the wave motion and its affect on the individual generators 452.

System 450 is modular. This allows system 450 to be easily scaled in the number of generators 452—and aggregate electrical output—to a particular application. FIG. 17A shows a continuum of generators 452, which may extended in length to form long chains, as desired. Generators 452 may also be replicated to form large area "patches" that are several generators 452 wide, as well as several generators long. The size and shape of system 450 may also be adapted to local topography and wave conditions. For example, adding generators 452 increases reaction forces on mechanical energy transmission system 455 due to inertial effects of the entire system, which permits greater electrical energy production in rough marine environments.

In one embodiment, system 450 includes a redundant number of generators 452. This redundant design permits system 450 to: a) harvest more energy from a given area of the sea, and/or b) harvest less energy but include fault tolerance in system 450 to accommodate one (or more) generator 452 malfunctions.

System 450 may also be expanded upon or repaired after initial deployment. Self-contained units 46 and many other moving parts in each generator 452 are located above the water line 458, where they can be easily built or serviced (including replacement).

The breakwater generators 400 and 450 may be flexibly located. Placement in front of an existing breakwater or seawall 404 allows the generator 400 to make use of reflected waves for added response. Breakwater generator 400 is also modular and thus able to operate one small unit or many units depending on power needs; flotation chambers 402 and mooring cables 420 can be added in series along the wall 404 to allow for different amounts of power generation. Additional lines may also be disposed in parallel lines in a direction normal to wall 404. System 450 has a similar number of mooring options. Each water brake 456 can be moored to the seafloor or breakwater or only a few of the water breaks could be moored to the sea floor.

Other marine devices that may benefit from a mechanical energy transmission system and generator described herein include guides for a shipping lane, wave attenuators that are configured to diminishing wave energy, floating barriers, or any floating marine device.

Methods

Figure 18:
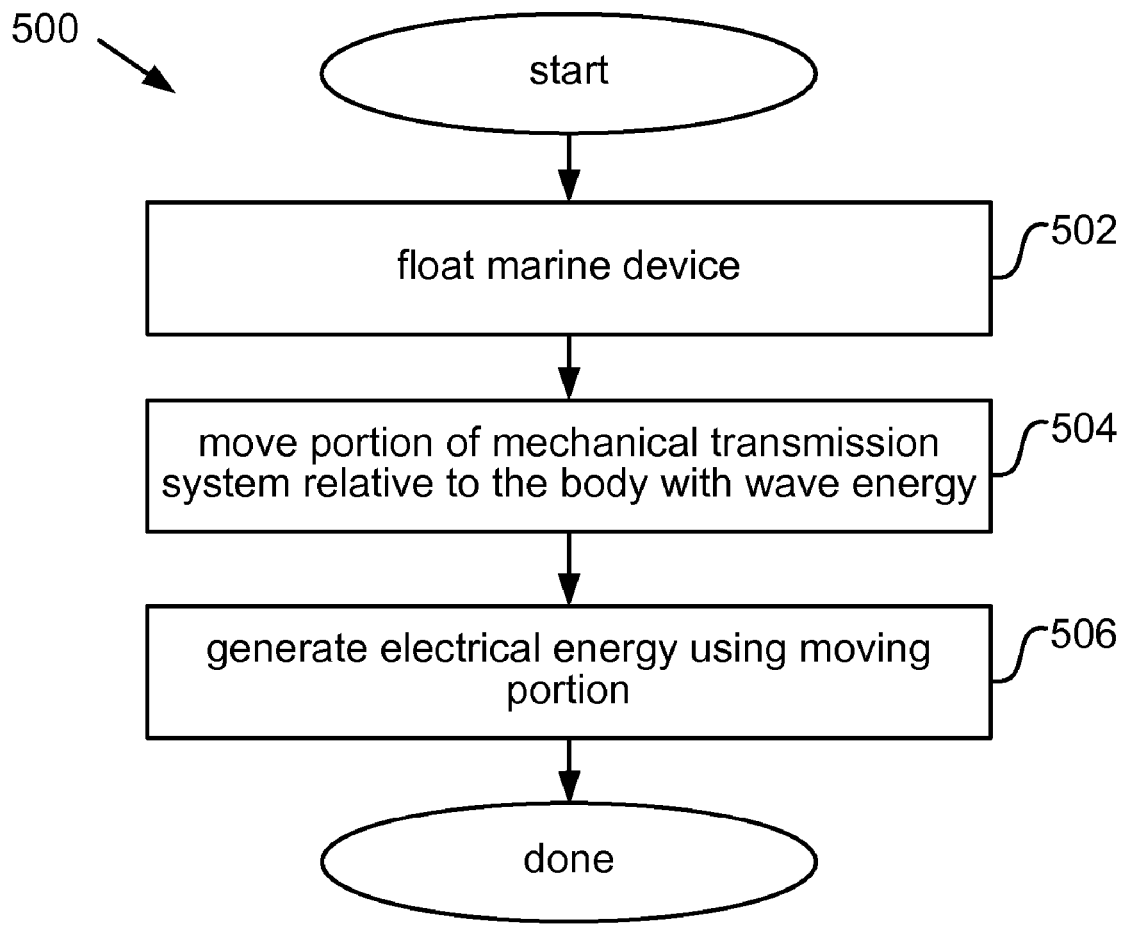
FIG. 18 shows a method of generating electrical energy in accordance with one embodiment of the present invention.

The present invention also relates to methods of generating electrical energy in a marine device. FIG. 18 shows a method 500 of generating electrical energy in accordance with one embodiment of the present invention.

Method 500 begins with floating the marine device such that a portion of the body rests above a water surface level when the marine device floats on the water (502). The marine device includes a mechanical energy transmission system and a generator. In one embodiment, the mechanical energy transmission system and generator are included in a self-contained unit that is added to the marine device long after its initial deployment. In a embodiment, the marine device is custom made with the mechanical energy transmission system and generator added during manufacture. The marine device is configured such that a portion of its body rests above a surface level of water when the marine device floats in the water.

Electrical energy generation method 500 then occurs when the water surface level changes and a portion of a mechanical transmission system moves relative to the marine device body in response to the water surface level change (504). As described above, the moving portion may include a proof mass or a rod (e.g., attached to a water brake in the water) that moves relative to the marine device body when the water surface level changes. For example, the marine device may rise when the water surface level rises, albeit at different rate or to different level than the moving portion. Alternatively, the marine device may tilt when the water surface level changes, which causes differential motion in the proof mass or rod relative to the body. Tilting in this sense refers to any rotation or rocking of the device from its position before the wave disturbance.

An energy storage mass or rod moves relative to the body typically because there is a degree of freedom between the energy storage mass or rod and the marine device body. In one embodiment, the energy storage mass moves along a single degree of freedom, such as a linear slide or via a rotational joint. In another embodiment, a stiffness associated with the energy storage mass is designed and configured such that resonant frequency of the mechanical energy transmission system is about equal to the marine device. This dynamic vibration absorption increases motion of the energy storage mass—which increases the amount of harnessed mechanical energy available for conversion to electrical energy. In another specific embodiment, the stiffness is tunable and matched reactively in real time by a control circuit to provide a resonant frequency for the mechanical energy transmission system that is about equal to the marine device.

Many of the mechanical energy transmission systems and generators described above are suitable to capture and convert wave energy despite the variance and inconsistency in water surface level changes between waves. The present invention is thus well suited to handle varying and inconsistent water surface level movements and waves with varying properties, such as those found in choppy water conditions.

Electrical energy is then generated using relative motion between the moving portion and the marine device body (506). Various generators suitable for use herein were described above. The electrical energy may be used immediately, converted in voltage, and/or stored for subsequent use.

In other embodiments an energy storage mass 506 is not used. Instead, the waves produce a displacement between two components of a linear transmission mechanism. This linear displacement is used to generate electricity with a generator coupled to accept the linear motion as mechanical input.

While this invention has been described in terms of several preferred embodiments, there are alterations, permutations, and equivalents that fall within the scope of this invention which have been omitted for brevity's sake. By way of example, although the present invention has been described in terms of several polymer materials and geometries, the present invention is not limited to these materials and geometries. It is therefore intended that the scope of the invention should be determined with reference to the appended claims.

What is claimed is:

1. A marine device comprising:
a body, wherein the marine device is configured such that a portion of the body rests above a water surface level when the marine device floats and configured such that the water surface level change causes movement of the body relative to the water surface level;
a mechanical energy transmission system including an energy storage mass, slideably coupled to a linear axis, and configured to linearly translate relative to the portion of the body that rests above the surface level of water and at an angle relative to the water surface level in response to a water surface level change; and
a generator mechanically coupled to the moving portion and to the portion of the body that rests above the water surface level, said generator comprising a spring having a tunable stiffness that produces electrical energy using kinetic energy of the energy storage mass along the linear axis.

2. The marine device of claim 1 wherein the body is configured such that the water surface level change causes movement of the body relative to the water surface level.

3. The marine device of claim 2 wherein the moving portion is configured to linearly translate relative to the portion of the body that rests above the surface level of water.

4. The marine device of claim 1 wherein the mass is configured to displace in a direction substantially opposite to a direction of displacement for the body when the water surface level changes.

5. The marine device of claim 1 wherein the spring includes a stiffness that provides a resonant frequency for the mechanical energy transmission system within about 0.2 hertz of a resonant frequency for the marine device.

6. The marine device of claim 1 further comprising a second energy storage mass that is configured to move relative to the body in response to the water surface level change.

7. The marine device of claim 6 further comprising a second generator configured to produce electrical energy using kinetic energy of the second energy storage mass.

8. The marine device of claim 1 wherein the mechanical energy transmission system is configured to rest above the surface level of the water when the marine device floats in the water.

9. The marine device of claim 1 wherein the device is a floating electrical energy generation device and includes a tether configured to transport electrical energy from the floating generation device.

10. A marine device comprising;
a body, wherein the marine device is configured such that a portion of the body rests above a surface level of water when the marine device floats;
a mechanical energy transmission system including
a) a first energy storage mass that is configured to move relative to the body in response to a water surface level change that causes tilting of the body relative to the water surface level, wherein the first energy storage mass is configured to move at a first angle relative to a vertical center of the body when the portion of the body rests above the water surface level, and
b) a second energy storage mass that is configured to move relative to the body in response to the water surface level change that causes tilting of the body relative to the water surface level, wherein the second energy storage mass is configured to move at a second angle relative to a vertical center of the body when the portion of the body rests above the water surface level; and
at least one generator mechanically coupled to the first energy storage mass and to the second energy storage mass, said at least one generator comprising a spring having a tunable stiffness that produces electrical energy using kinetic energy of the first energy storage mass and the second energy storage mass.

11. The marine device of the claim 10 wherein the first energy storage mass is slideably coupled to a linear axis and the generator in configured to produce electrical energy using kinetic energy of the first energy storage mass along the linear axis.

12. The marine device of claim 10 further comprising a spring mechanically coupled to the first energy storage mass and mechanically coupled to the body.

* * * * *